(12) United States Patent
Ikeda et al.

(10) Patent No.: US 6,457,577 B1
(45) Date of Patent: Oct. 1, 2002

(54) VIBRATORY CONVEYOR

(75) Inventors: Masahiro Ikeda; Toshiro Sekine, both of Toyohashi; Kazumichi Kato, Ise; Yasushi Muragishi, Ise; Tetsuyuki Kimura, Ise, all of (JP)

(73) Assignee: Shinko Electric Company, Ltd., Tokyo (JP)

( * ) Notice: Subject to any disclaimer, the term of this patent is extended or adjusted under 35 U.S.C. 154(b) by 0 days.

(21) Appl. No.: 09/955,784

(22) Filed: Sep. 19, 2001

Related U.S. Application Data

(62) Division of application No. 09/255,283, filed on Feb. 22, 1999, now Pat. No. 6,318,542.

(30) Foreign Application Priority Data

Feb. 23, 1998 (JP) .............................................. 10-57441
May 19, 1998 (JP) ............................................ 10-153853
Jul. 21, 1998 (JP) ............................................ 10-221021

(51) Int. Cl.[7] ........................ B65G 25/04; B65G 27/32; B65G 27/24
(52) U.S. Cl. .................... 198/750.1; 198/762; 198/769; 198/766
(58) Field of Search .............................. 198/750.1, 761, 198/762, 766, 769

(56) References Cited

U.S. PATENT DOCUMENTS

| | | | | |
|---|---|---|---|---|
| 4,979,608 A | * | 12/1990 | Mikata et al. | ............... 198/769 |
| 5,821,657 A | * | 10/1998 | Falconer et al. | ............ 198/769 |
| 5,853,082 A | * | 12/1998 | Buckley et al. | .......... 198/752.1 |
| 5,931,285 A | * | 8/1999 | Madsen et al. | ............. 198/762 |
| 6,079,549 A | * | 6/2000 | Meitinger | .................... 198/762 |
| 6,079,550 A | * | 6/2000 | Gilman | ........................ 198/761 |
| 6,168,010 B1 | * | 1/2001 | Komatsu | ..................... 198/761 |

* cited by examiner

Primary Examiner—Christopher P. Ellis
Assistant Examiner—Gene O. Crawford
(74) Attorney, Agent, or Firm—Carothers & Carothers

(57) ABSTRACT

In a vibratory conveyor which includes a trough for transporting objects, an exciting mechanism for vibrating the trough in a horizontal direction and a supporting mechanism for supporting the trough so as to be vibratile in the horizontal direction, the exciting mechanism is a linear motor, one of the primary and secondary sides of the linear motor is fixed to the trough and the other is facing to the one side with a predetermined gap and so arranged as to be vibratile relative to the one side.

3 Claims, 24 Drawing Sheets

TROUGH MOVEMENT

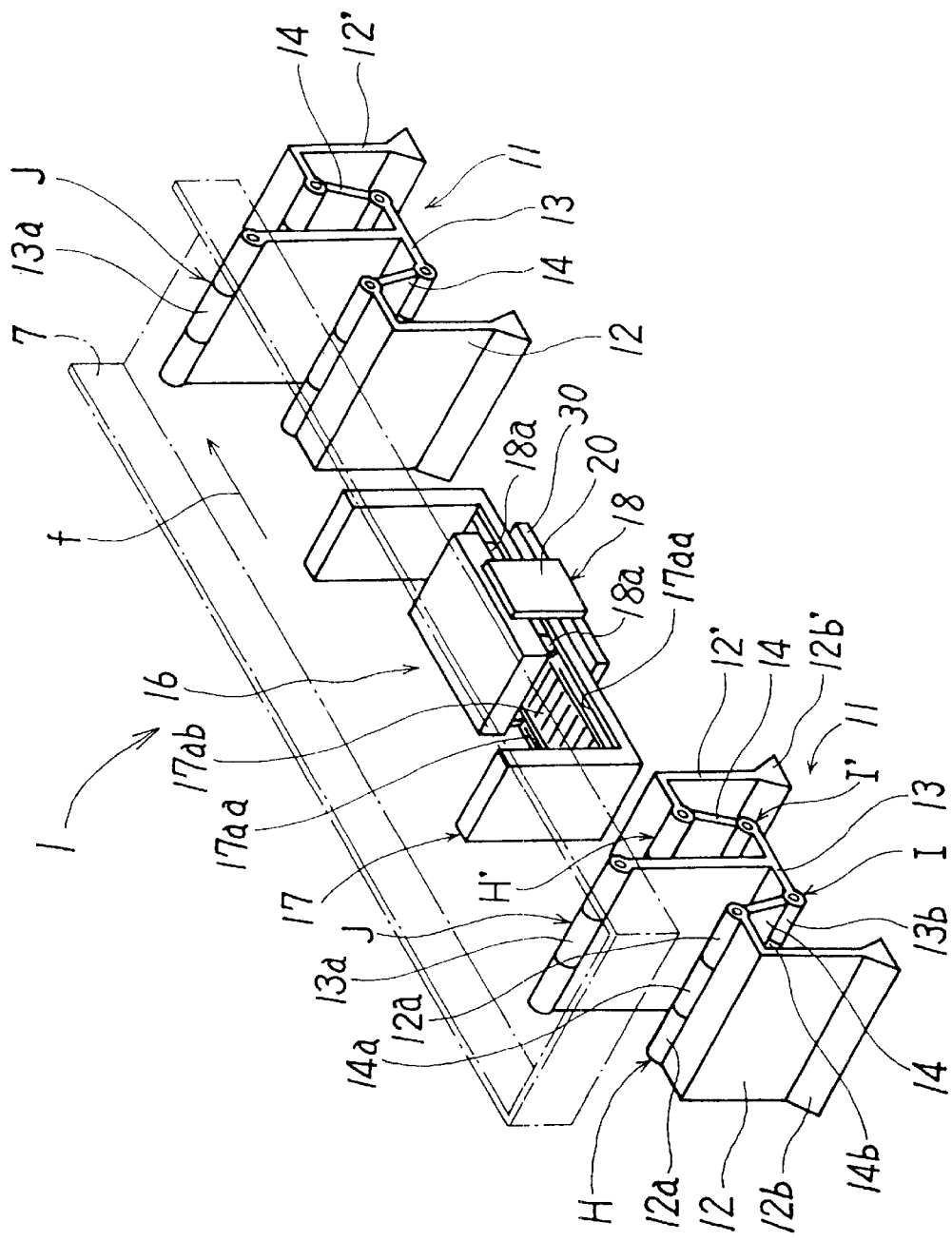

VIBRATORY CONVEYOR

CROSS REFERENCE

This application is a division of U.S. application Ser. No. 09/255,283, filed Feb. 22, 1999 for VIBRATORY CONVEYOR now U.S. Pat. No. 6,318,542.

BACKGROUND OF THE INVENTION

1. Field of the Invention

This invention relates to a vibratory conveyor which conveys or transports material or various objects by vibration or solely by a sliding action.

2. Description of the Prior Art

In most vibratory conveyors which convey objects in a straight line, a trough is linearly vibrated in a direction which is slanted to the conveying surface. The objects are jumping repeatedly and are moved forward. The free flight of metal objects end with an impact which would increase noise. Free flight of the fragile objects ends with an impact which might lead to damage of the fragile objects.

In order to avoid these undesirable effects, the so-called "reciprocating conveyor" is developed in which the objects are conveyed solely by a sliding action, i.e., without leaving the surface of the conveyor. One example of the reciprocating conveyors is shown in FIG. 1 and is disclosed in the Japanese Opening Gazette 123812/1980.

A reciprocating conveyor 100 includes a trough 150 which is U-shaped in cross-section and vibrated by an exciter 110 in a horizontal direction. The objects are transported rightwards in the trough 150.

The trough 150 is supported on a base 109 through vertical leaf springs 152. The upper and lower ends of the leaf springs 152 are fixed to the trough 150 and the base 109 through fixing members 153a and 153b, respectively. The trough 150 is vibrated in the direction X by the exciter 110. The latter is combined with the former by horizontal leaf springs 129. The left and right ends of the leaf springs 129 are fixed to the exciter 110 and trough 150 through angular members 154 and 114 (FIG. 2). The leaf springs 152 are rigid in its longitudinal direction, while they are flexible in its lateral direction. Little force is applied in the vertical direction to the trough 150 by cooperation of the leaf springs 129 and coil springs 128 supporting the exciter 110 from the latter.

FIG. 2 is a plan view of the exciter 110 and portions relating thereto. FIG. 3 is a cross-sectional view taken along the line III—III in FIG. 2. As shown in FIG. 3, the exciter 110 consists of a pair of exciting mechanisms 131a and 131b which are attached to housings 111a and 111b (FIG. 1), respectively. They are fixed to each other through spacers 127 as one body, and supported on the base 109 through the coil springs 128.

The exciting mechanisms 131a and 131b are equal to each other in construction, and are arranged symmetrically with respect to each other. Only the construction of the exciting mechanism 131a will be described. A first rotational shaft 135a is supported by bearings 133a and 134a which are fixed to the housing 111a. A first semi-circular unbalance weight 136a of larger diameter is fixed to the first rotational shaft 135a. Similarly, a second rotational shaft 145a is supported by bearing 143a and 144a which are fixed to the housing 111a. A second semicircular unbalance weight 146a of smaller diameter is fixed to the second rotational shaft 145a.

An electric motor 121a is fixed on a back wall portion of the housing 11la. A belt 123a is wound on a pulley 122a fixed to a rotary shaft of the electric-motor 121a and another pulley 137a fixed to one end of the first rotary shaft 135a. A large-diameter. gear 139a is fixed to another end of the first rotary shaft 135a, and engaged with a small-diameter gear 149a fixed to one end of the second rotary shaft 145a. The number of teeth of the small-diameter gear 149a is half of that of the large-diameter gear 139a. Thus, the second rotary shaft 145a is rotated in opposite direction to the first rotary shaft 135a, at the twice angular speed as the latter. Suffix b is attached to those of the other exciting mechanism 131b which correspond to the parts of the one exciting mechanism 131a, and the description of which will be omitted.

The first and second unbalance weights 136a, 136b and 146a, 146b of the exciting mechanisms 131a and 131b are fixed to the first and second rotary shafts 135a, 135b and 145a, 145b, respectively in the angular phase relationship as shown in FIG. 3. Accordingly, the composite force generated by the exciting mechanisms 131a and 131b, in the vertical direction Y is always equal to zero.

The construction of the reciprocating conveyor 100 of the prior art has been described. Next, its operation will be described.

The two first unbalance weights 136a are fixed to the rotary shaft 135a in the exciting mechanism 131a. However, they are equivalent in effect to the one first unbalance weight which is double in weight and is fixed to the center of the rotary shaft 135a. For simplification of the description, it is assumed that the one unbalance weight having the weight double as the first unbalance weight 136a is fixed to the center of the rotary shaft 135a. Similarly in the other exciting mechanism 131b, it is assumed that the one unbalance weight having the weight double as the first unbalance weight 136b is fixed to the center of the rotary shaft 135b.

Referring to FIG. 3, the electric motors 121a and 121b are rotated in opposite directions, in synchronization with each other. In the one exciting mechanism 131a, the first rotary shaft 135a is rotated in clockwise direction through the belt 123a, while the second rotary shaft 145a is rotated in anti-clockwise direction at the twice angular speed, since the larger gears 139a and the small gear 149a are engaged with each other.

In the other exciting mechanism 131b, the first rotary shaft 135b is rotated in anti-clockwise direction through the belt 123b, while the second rotary shaft 145b is rotated in clockwise directions at the twice angular speed, since the gears 139b and 149b are engaged with each other.

As shown in FIG. 4, the X-components Fax, Fbx of the centrifugal forces Fa, Fb generated from the first unbalance weights 136a, 136b in t seconds, are as follows:

$$Fa_x = -Fa\sin(\omega t), Fb_x = -Fb\sin(\omega t)$$

where $\omega$ represents angular speed.
Accordingly, $$F_x = Fa_x + Fb_x = -2Fa\sin(\omega t)$$

Similarly, the X-components fax, fbx of the centrifugal forces fa, fb generated from the second unbalance weights 146a, 146b, $$fa_x = fa\sin(2\omega t),$$

are as follows:

$$fb_x = fb\sin(2\omega t).$$

Accordingly, the composite force $f_x$ is as follows:

$$f_x = fa_x + fb_x = 2fa\sin(2\omega t)$$

Accordingly, the X-composite force $Q_x$ as whole, $$Q_x = F_x + f_x = -2Fa\sin(\omega t) + 2fa\sin(2\omega t)$$

The trough 150 is excited by the force $Q_x$. The Y-components Fay, Fby of the centrifugal forces Fa, Fb generated from the first unbalance weights 136a, 136b in t seconds is as follows:

$$Fa_y = -Fa\cos(\omega t),\ Fb_y = Fb\cos(\omega t)$$

The composite force $F_y$ is as follows:

$$F_y = Fa_y + Fb_y = 0$$

Similarly, the Y-component fay, fby of the centrifugal forces fa, fb generated from the second unbalance weights 146a, 146b are as follows:

$$fa_y = -fa\cos(2\omega t),\ fb_y = fa\cos(2\omega t)$$

Thus, the composite force $f_y$ is as follows:

$$f_y = fa_y + fb_y = 0$$

Accordingly, the Y-composite force $Q_y$ of the centrifugal forces generated from the first and second unbalance weights 136a, 136b, and 146a, 146b, are always equal to zero.

$$Q_y = F_y + f_y = 0$$

The composite force $Q_x$ is applied to the trough 150 only in the X-direction.

$$Q_x = F_x + f_y = -2Fa\sin(\omega t) + 2fa\sin(2\omega t).$$

In graph shown in FIG. 5A, axis of ordinates represents exciting force in the X-direction, and axis of abscissas represents time. The composite forces $Q_x$, $F_x$ and $f_x$ change with time, as shown in FIG. 5A, where $F_x = 2f_x$.

The reciprocating conveyor 100 is composed of one-mass system, according to the theory of the vibration technology. The resonant frequency of the reciprocating conveyor 100 is determined by a spring constant of all of the leaf springs 152, and a mass supported by the leaf springs 152.

When the spring constant of all of the leaf springs 152 is sufficiently small, and the trough 150 is vibrated by the force of higher frequency than the resonant frequency, the phase defference between the force $Q_x$ and the displacement of the trough 150 is equal to 180 degrees. Thus, the trough 150 is displaced as shown by curve D in the graph of FIG. 5A. The trough 150 moves forwards to the point p at the lower speed and moves backwards to the point q from the point p at the higher speed. FIG. 5B shows schematically such changes. The exciting force overcomes the frictional force between the object to be conveyed, and the conveying surface of the trough 150 during the high speed backward-movement period $T_1$ to $T_2$. Thus, only the trough 150 moves backwards, and the object remands on the original position. The object and the trough 150 move together during the low spread period $T_2$ to $T_3$. Accordingly, the object is transported forwards.

The first and second unbalance weights 136a, 136b and 146a, 146b are rotated in the above described manner so that the trough 150 is vibrated only in the horizontal direction.

The belts 123a, 123b and gears 139a, 139b are arranged in the exciting mechanism 110, which make noise. The exciting mechanism 110 is complicated in construction.

In the above-described reciprocating conveyor 100, the vibration of the trough 150 is non-sinusoidal and horizontal. The amplitude of the vibration is determined by the exciting force $Q_x$ which is generated by rotation of the first and second unbalance weights 136a, 136b and 146a, 146b. The exciting force $Q_x$ is determined by the centrifugal forces of the first and second unbalance weights 136a, 136b and 146a, 146b. The frequency of the exciting force $Q_x$ is determined by the rotational speed of the electric motors 121a, 121b which drive the first and second unbalance weights 136a, 136b and 146a, 146b. Thus, the rotational speed of the electric motors 121a, 121b and the centrifugal forces of the first. and second unbalance weights 136a, 136b, and 146a and 146b should be adjusted to obtain a desired vibration. The construction should be changed. It is difficult to obtain an arbitrary vibration by the prior art exciting mechanism 110. Accordingly, it is difficult to adjust a transporting speed and it is impossible to adjust the exciting mechanism so as to transport objects efficiently.

In order to avoid the above described disadvantages, the assignee developed such a reciprocating conveyor that uses a linear motor as an excitor in which pole change of primary windings and polarity change-over are made at the same time (Japanese Publication number 35395/1779). However, this reciprocating conveyor generates the reaction force which is transmitted to the base through the linear motor. In order to avoid the disadvantage, it is described that two troughs are arranged in line with each other, and they are excited in opposite directions by the respective linear motors, in the same Publication. To cancel the reaction forces from each other, such a complicated control should be effected that the respective troughs are slowly moved forwards and rapidly moved backwards in synchronization with each other.

SUMMARY OF THE INVENTION

It is an object of this Invention to provide a vibratory conveyor or reciprocating conveyor which is simple in construction, makes little noise, can easily adjust a transporting speed of object and transmits little reaction force to the mounting base.

In accordance with an aspect of this Invention, in a vibratory conveyor which includes a trough for transporting objects, exciting means for vibrating said trough in a horizontal direction and supporting means for supporting said trough so as to be vibratile in said horizontal direction, the improvements in which said exciting means is linear motor means, one of the primary and secondary sides of said linear motor means is fixed to said trough and the other is facing to said one with a predetermined gap and so arranged as to be vibratile relative to said one.

In accordance with another aspect of the inventions, in a vibratory conveyor which includes a trough for transporting objects, exciting means for vibrating said trough in a horizontal direction and supporting means for supporting said trough so as to be vibratile in said horizontal direction, the improvements in which said exciting means is linear motor means, one of the primary and secondary sides of said linear motor means is fixed to said trough and the other is facing to said one with a predetermined gap and supported through elastic material or vibration absorbing material on a mounting base.

The other objects, features, and advantages of the present invention will be more readily understood upon consideration of the following detailed description of the preferred embodiments of the invention, taken in conjunction with the accompanying drawings.

BRIEF DESCRIPTION OF THE DRAWINGS

FIG. 5 is a graph showing the relationship between the exciting force generated from unbalance weight and the trough movement.

FIG. 6 is a perspective view of a vibratory conveyor according to a first embodiment of this invention.

FIG. 19A is one form of the one principle and FIG. 19B is another form of the one principle of this invention.

FIG. 20A is one form of the other principle of this invention and FIG. 20B is another form of the other principle of this invention.

DESCRIPTION OF THE PREFERRED EMBODIMENTS

Figure 19:
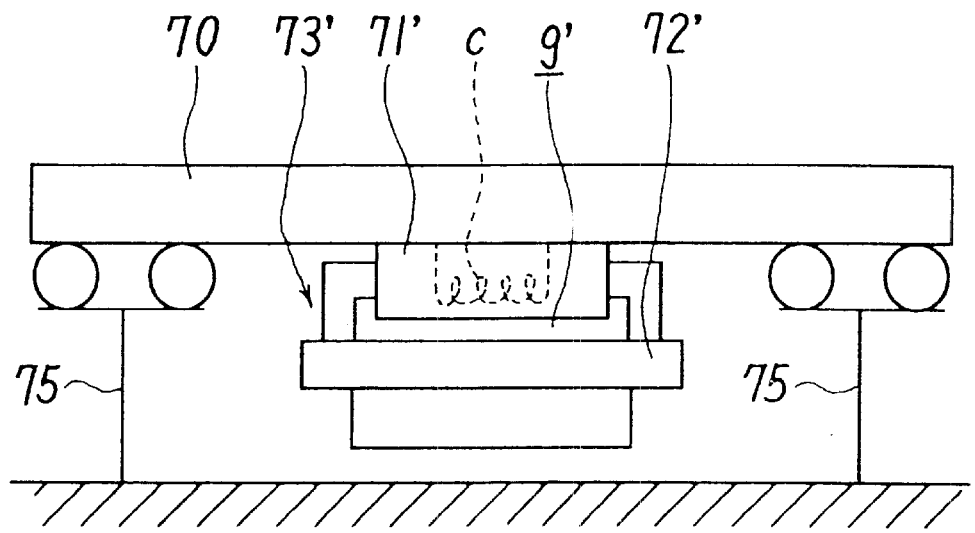
FIG. 19 is a side view showing one principle of this invention.
Figure 19:
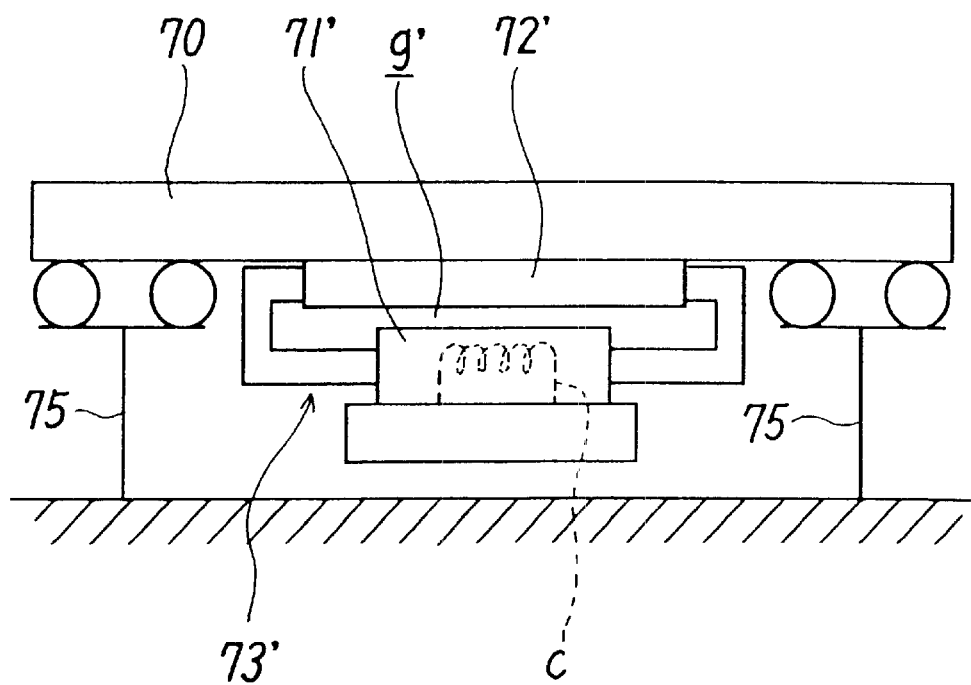

FIG. 19 shows a principle of the first invention, and FIG. 19A shows one form of the principle.

A trough 70 is so supported as to be vibratile in a horizontal direction, by support members 75 and 75. A primary side 71' of a linear motor 73' which includes coils C, is fixed to the trough 70. A secondary side 72' of the linear motor 73' is facing to the primary side 71' thereof with a predetermined gap g', and is so arranged as to be vibratile in opposite direction to the trough 70. FIG. 19B shows another form of the principle.

Figure 20:
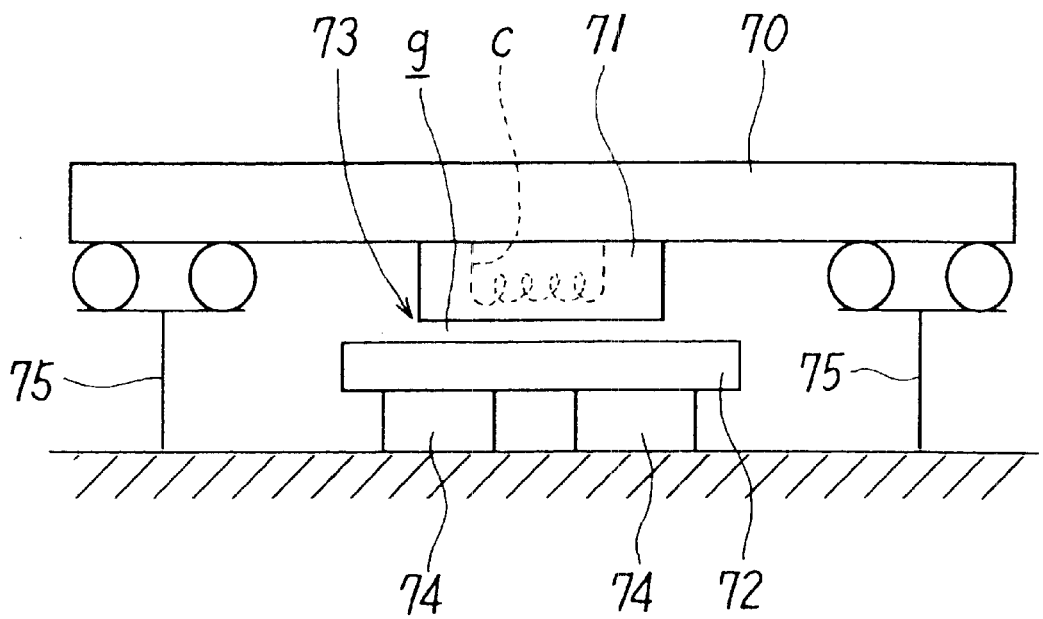
FIG. 20 is a side view showing the other principle of this invention.
Figure 20:
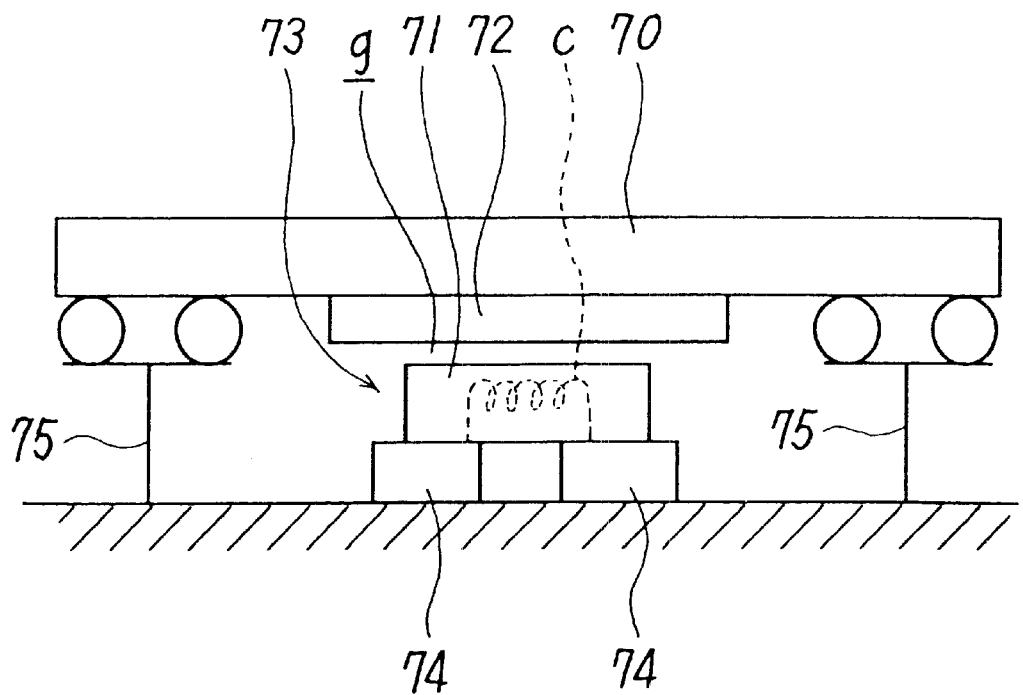

A trough 70 is so supported as to be vibratile in a horizontal direction, by support members 75 and 75. A secondary side 72' of a linear motor 73' is fixed to the trough 70. A primary side 71' of the linear motor 73' is facing to the secondary side 72' thereof with a predetermined gap g', and is so arranged as to be vibratile in opposite direction to the trough 70. According to the second invention, in a vibratory conveyor which includes a trough for transporting objects, exciting means for vibrating said trough in a horizontal direction and supporting means for supporting said trough so as to be vibratile in said horizontal direction, said exciting means is linear motor means, one of the primary and secondary sides of said linear motor means is fixed to said trough and the other is facing to said one with a predetermined gap and supported on a mounting base or ground through elastic material or vibration-absorbing material. FIG. 20 shows a principle of the second invention, and FIG. 20A shows one form of the principle.

A trough 70 is so supported as to be vibratile in a horizontal direction, by support members 75 and 75. A primary side 71 of a linear motor 73 which includes coils C, is fixed to the trough 70. A secondary side 72 of the linear motor 73 is facing to the primary side 71 thereof with a predetermined gap g, and is supported through elastic material or vibration-absorbing material 74 on a mounting base.

FIG. 20B shows another form of the principle.

A trough 70 is so supported as to be vibratile in a horizontal direction, by support members 75 and 75. A secondary side 72 of a linear motor 73 is fixed to the trough 70. A primary side 71 of the linear motor 73 is facing to the secondary side 72 thereof with a predetermined gap g, and is supported through elastic material or vibration-absorbing material 74 on a mounting base.

With the above-described arrangements of these inventions, the exciting mechanism is simple in construction, and makes little noise, since no gears are used in contrast to the prior art. The control is simple for transporting objects efficiently.

In the first invention, the reaction force is cancelled with movement of the primary or secondary side in opposite direction to the trough 70.

In the second invention, the reaction force is absorbed with the elastic material or vibration-absorbing material, when the trough 70 is vibrated. Reaction force is not transmitted to the mounting base. When the elastic material or vibration-absorbing material is plate-like or pillar-like, the arrangement can be simple.

Next, embodiments of this invention will be described with reference to the drawings.

Figure 1:
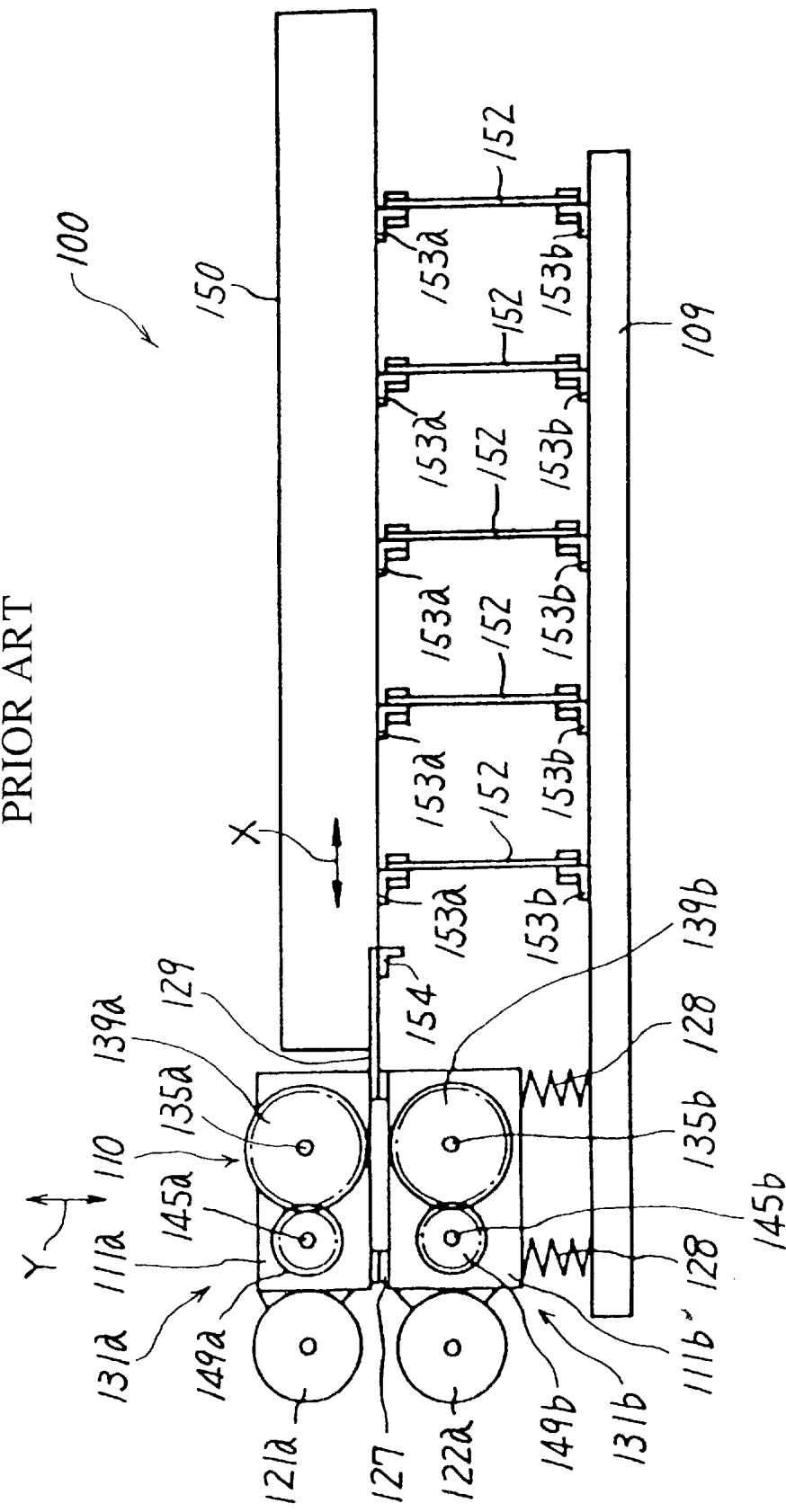
FIG. 1 is a side view of a vibratory conveyor of the prior art.
Figure 2:
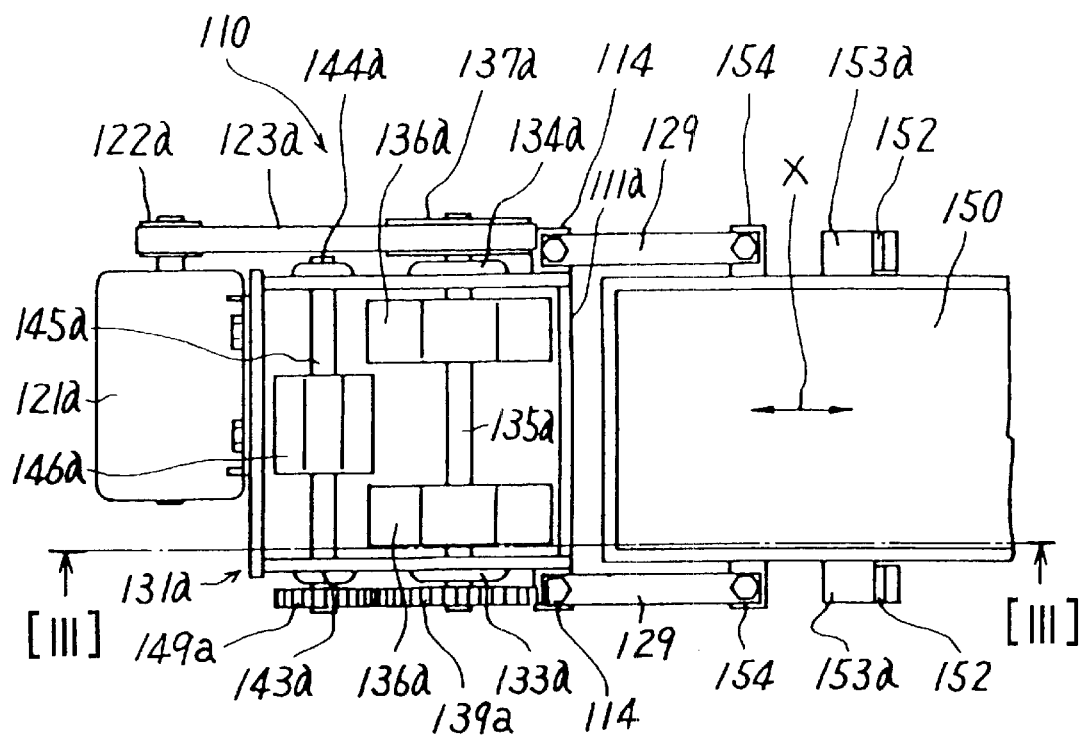
FIG. 2 is a plan view of an exciter and portions relating thereto in the vibratory conveyor of the prior art.
Figure 3:
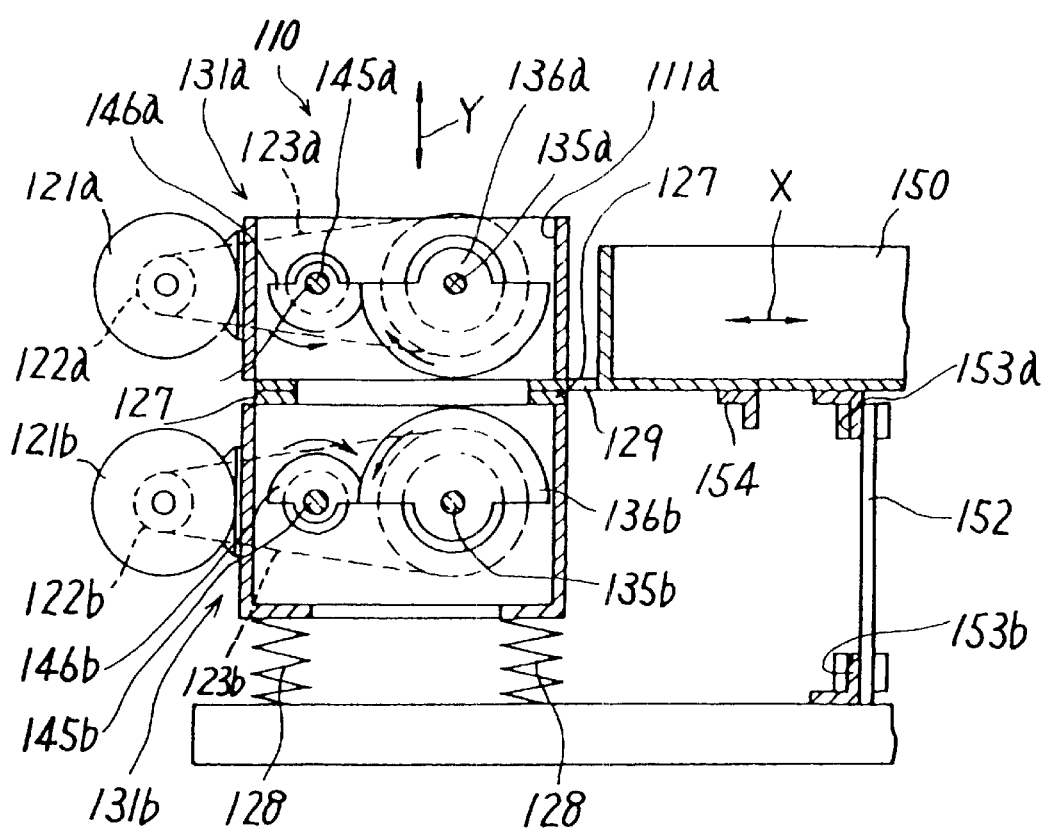
FIG. 3 is a cross-sectional view take along the line [III]—[III] in FIG. 2.
Figure 4:
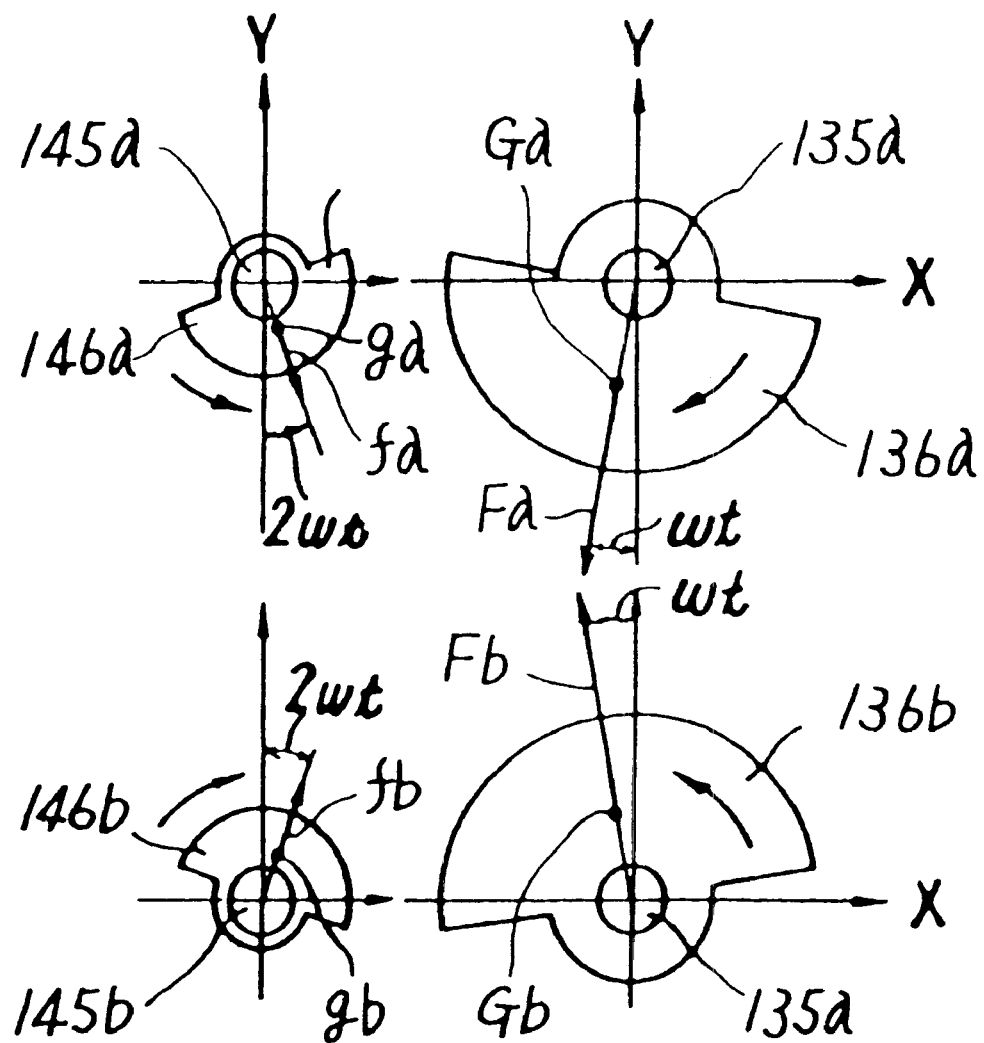
FIG. 4 is a front view of unbalance weights in the prior art for explaining operations of the exciter.
Figure 5A:
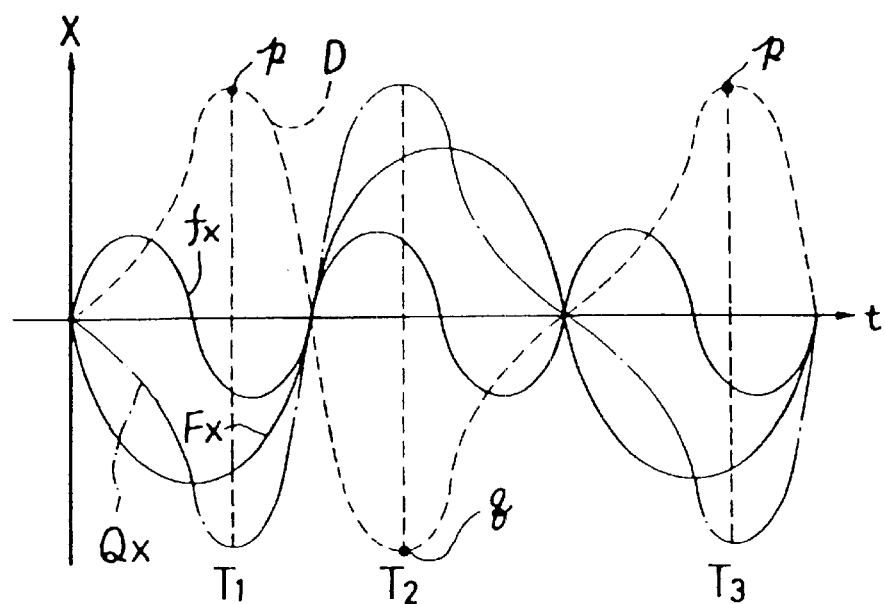
FIG. 5A shows time charts of the force and displacement.
Figure 5B:
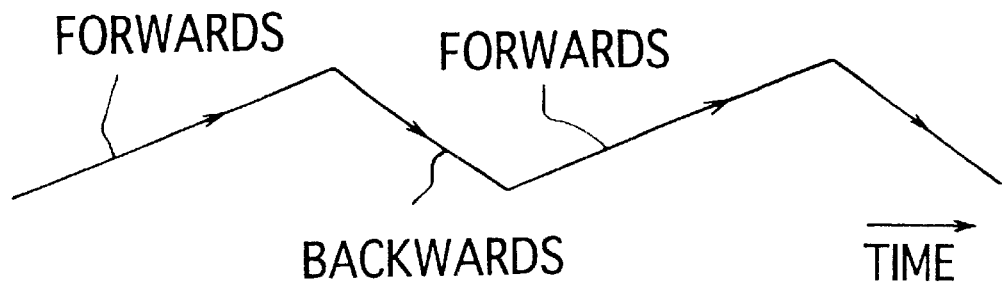
FIG. 5B shows the trough movement.
Figure 7:
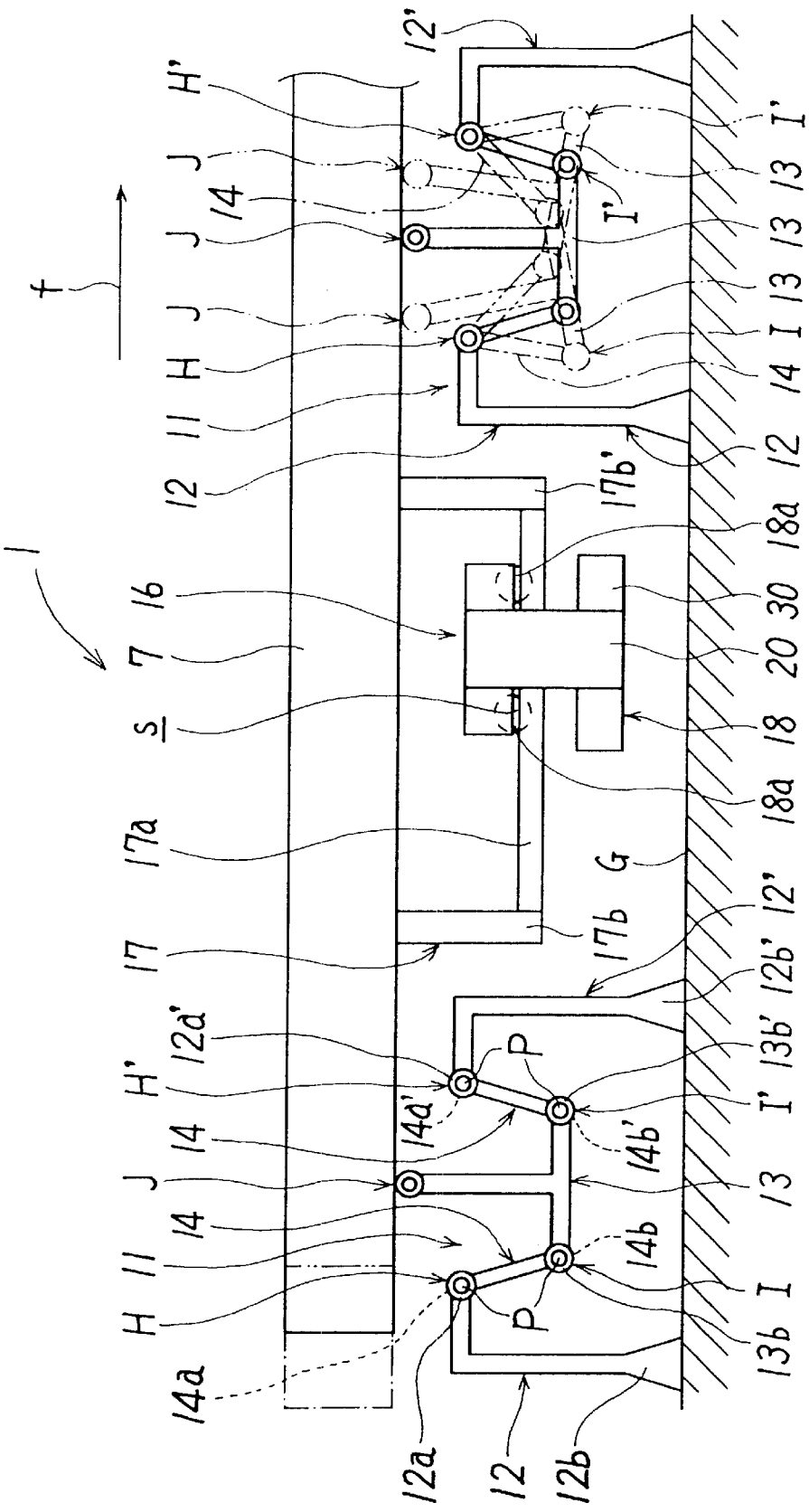
FIG. 7 is a side view of a vibratory conveyor according to the first embodiment.

FIG. 6 shows a perspective view of a vibratory conveyor 1 according to the first embodiment of this invention, and FIG. 7 shows a front view. In the vibratory conveyor 1, a trough 7 is supported by two support mechanism 11 which are swingably attached to the trough 7 at the top ends forming hinge portions J. An exciting source is attached to the trough 7. It is a linear motor 16. Not-shown objects are included in the trough 7. The objects are transported from left to right as shown by the arrow f. In FIG. 6, the trough 7 is shown by the dot-dash lines in order to clearly show construction of the support mechanism 11 including links and the linear motor 16.

The support mechanism 11 consists of two supporting legs 12, 12', a movable portion 13 and two connecting portions 14. The supporting legs 12, 12' have inverted-L shaped form, and the bottom portions 12b and 12b' are supported on the mounting surface or ground G. The horizontal portions 12a, 12a' (FIG. 7) of the supporting legs 12, 12' are combined with the end portions 14a, 14a' (FIG. 7) of the connecting portions 14. Pins P are inserted into the end portion 14a, 14a' of the connecting portions 14 and so construct hinge portions H, H'. The movable portions 13 at their horizontal end portions 13b, 13b' are combined with the end portions 14b, 14b' of the connecting portions 14. Pins P are inserted into the end portions 14b, 14b'. Thus, they form hinge portions I, I'. Accordingly, with the hinge portions H, H' and I, I', the movable portions 13 are swingable. The movable portions 13 are swung as shown by the dot-dash lines and two-dot dash lines in FIG. 7. the horizontal portions 13a can be swung in the horizontal direction. Thus, the trough 7 attached to the horizontal portions 13a (FIG. 6) of the movable portions 13 can be supported so as to be vibratile in the transporting direction of the object.

The linear motor 16 of this embodiment, as shown in FIG. 7, consists of secondary members 17 fixed to the bottom of the trough 7 and primary members 18 supported by wheels or disk 18a on the secondary members 17. The secondary members 17 consist of horizontal portion 17a and support potions 17b and 17b' fixed to both ends of the horizontal portion 17a. The secondary members 17 are U-shaped as one body.

A pair of grooves 17aa, 17aa (FIG. 8) extending in the horizontal direction are formed in the horizontal portion 17a of the secondary members 17. The wheels 18a are guided in the grooves 17aa, 17aa. Magnetic teeth 17ab are arranged between the grooves 17aa, 17aa in vertical direction to the transporting direction of the object.

Figure 8:
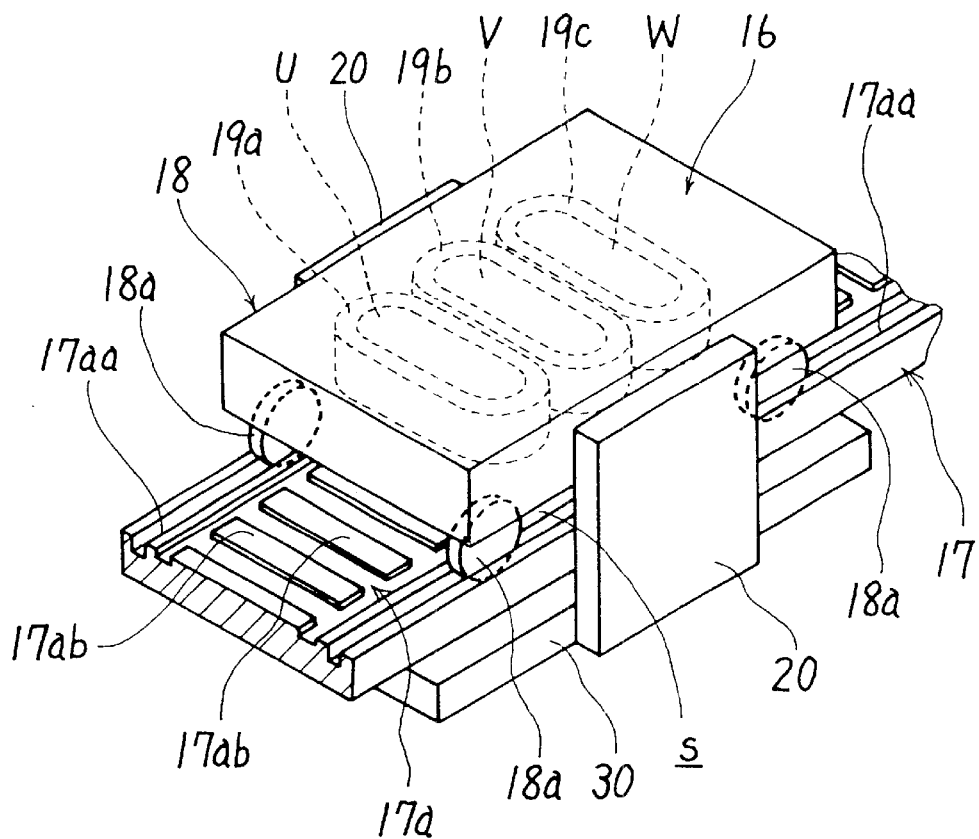
FIG. 8 is a perspective view of a linear motor used in the first embodiment.
Figure 9:
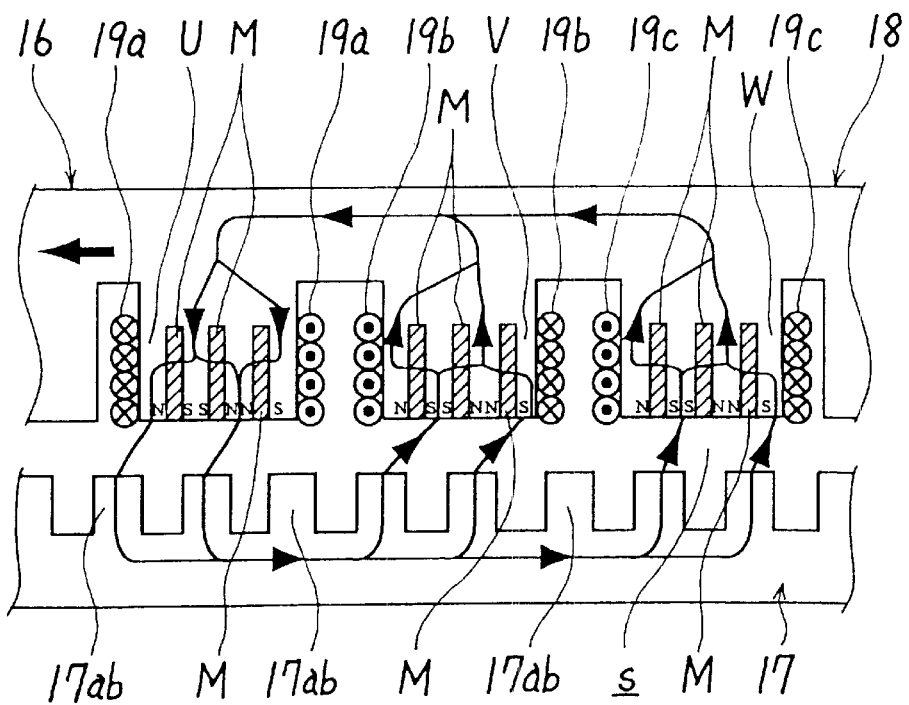
FIG. 9 is a view showing principal operations of the linear motor of FIG. 8.

FIG. 8 is an enlarged perspective view of the linear motor 16. The wheels 18a in the primary members 18 of the linear motor 16 are fixed to not-shown shafts. An air gap s is formed by wheels 18a. The primary members 18 includes three magnetic poles U, V, W on which the coils 19a, 19b, 19c are wound. Laminar permanent magnets M(three) are inserted in the magnetic poles U, V, W as shown in FIG. 9. Three-phase alternating currents shifted from each other by 120 degrees in phase are supplied to the coils 19a, 19b and 19c. An additional mass 30 is fixed through mounting members 20 to the primary members 18. The primary members 18 are spaced from the mounting surface G in the air. The vibratory conveyor 1 of this embodiment is constructed in the above described member.

Next, operations of the linear motor 16 of this embodiment which is of the high density type, will be described. The operations will be described with reference to FIG. 9.

The permanent magnets M are so arranged that the same polarities are facing to each other. When the currents are flowed through the coils 19a, 19b, 19c as shown by the marks ⊗ and ⊙, magnetic flux flows in the cores of the primary and secondary members 17, 18 as shown by the arrows. When the magnetic flux from the permanent magnets M is in the same direction as the magnetic flux due to the current flowing through the coils 19a, 19b, 19c, the latter and former are added to each other. When the former is in the opposite direction to the latter, they are canceled from each other. As the result, the thrust or horizontal drive force of the linear motor 16 is increased. Currents are flowed through the coils 19a, 19b and 19c, shifted in phase 120 degrees and 240 degrees. Attractive forces are generated between the magnetic teeth 17ab of the secondary members 17 and the poles U, V, W of the primary members 18. Thus, the primary members 18 are moved leftwards.

The currents flowing through the coils 19a, 19b and 19c are shifted from each other in phase 120 degrees. The magnetic attractive force is generated between the magnetic teeth 17ab and the magnetic poles U, V, W. Thus, the primary members 18 are moved leftwards. The primary members 18 slide on the secondary members 17 through the wheels 18a. The secondary members 17 at the horizontal portion 17a receive the reaction force from the primary members 18. Accordingly, the secondary members 17 are moved rightwards in opposite direction to the movement of the primary members 18. Thus, the trough 7 fixed to the secondary members 17 is moved rightwards. The current is so adjusted that the primary members 18 is moved forwards slowly and backwards rapidly.

With the above described operation, the trough 7 is moved rapidly in the forward direction and then moved back slowly in the backward direction. Thus, the object is moved rightwards.

In this embodiment, the linear motor 16 is used as a driving exciting source for vibrating horizontal the trough of the vibratory conveyor 1. Accordingly, driving forces of an arbitrary form can be generated and so the vibration of a desired form can be obtained. The object can be transported efficiently. The change of moving direction and the transporting speed can be easily controlled without complicated construction. No gear is used. Little noise is made. Further, in the vibratory conveyor 1 of this embodiment, the secondary side of the linear motor 16 receives reactive force due to movement of the primary members 18, so that the trough 7 is vibrated. Accordingly, reactive force is not transmitted to the mounting surface on which the vibratory conveyor is mounted. Further, in this embodiment, the mass 30 is fixed to the primary members 18 and so the movement of the primary members 18 in the opposite direction to that of the trough 7 can be reduced, so that the primary member 18 does not collide with the portions 17b, 17b of the secondary members 17. The vibratory conveyor 1 can be surely vibrated in the horizontal direction by the supporting mechanism 17b and 17b' of the secondary members 17.

Figure 10:
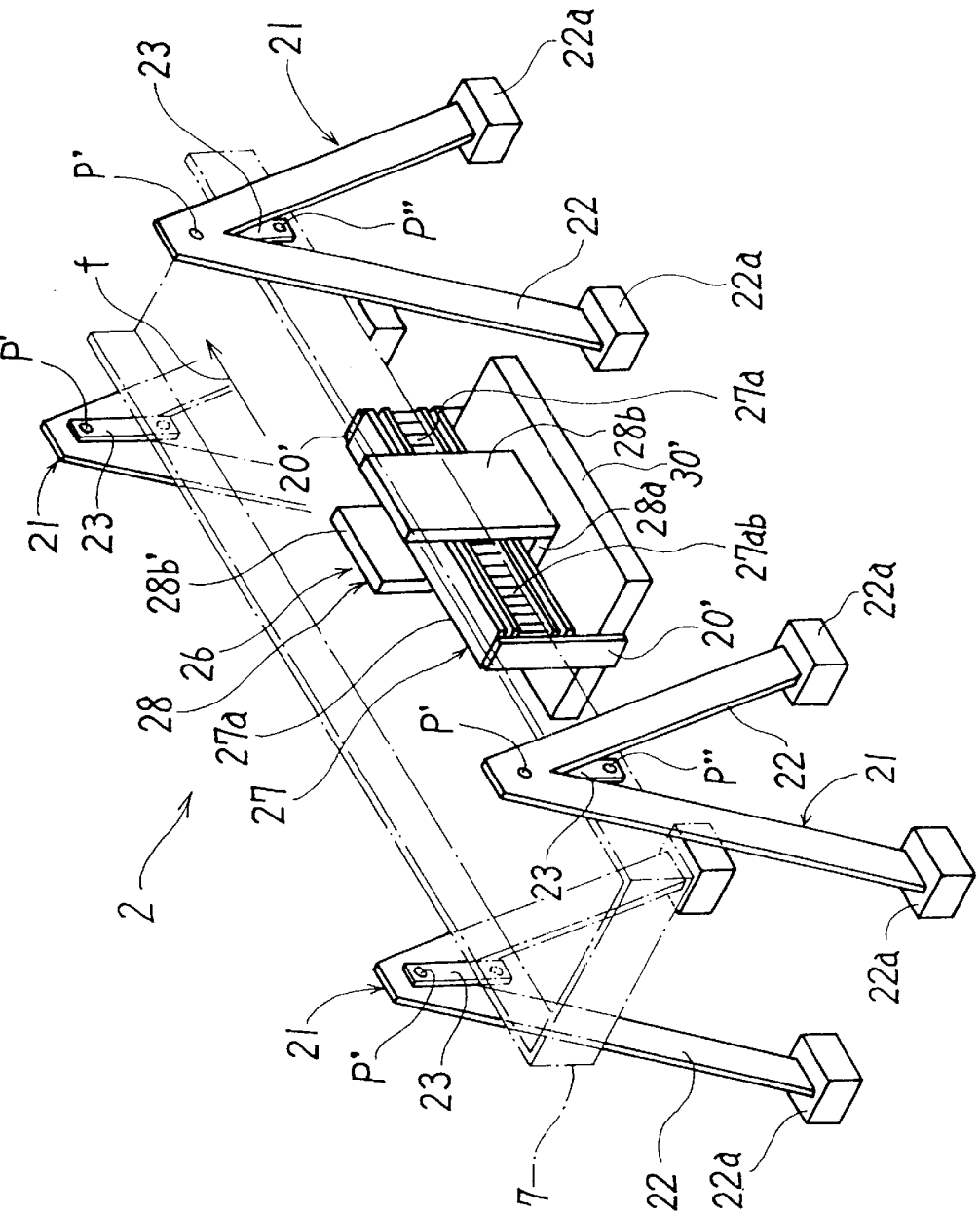
FIG. 10 is a perspective view of a vibratory conveyor according to a second embodiment of this invention.
Figure 11:
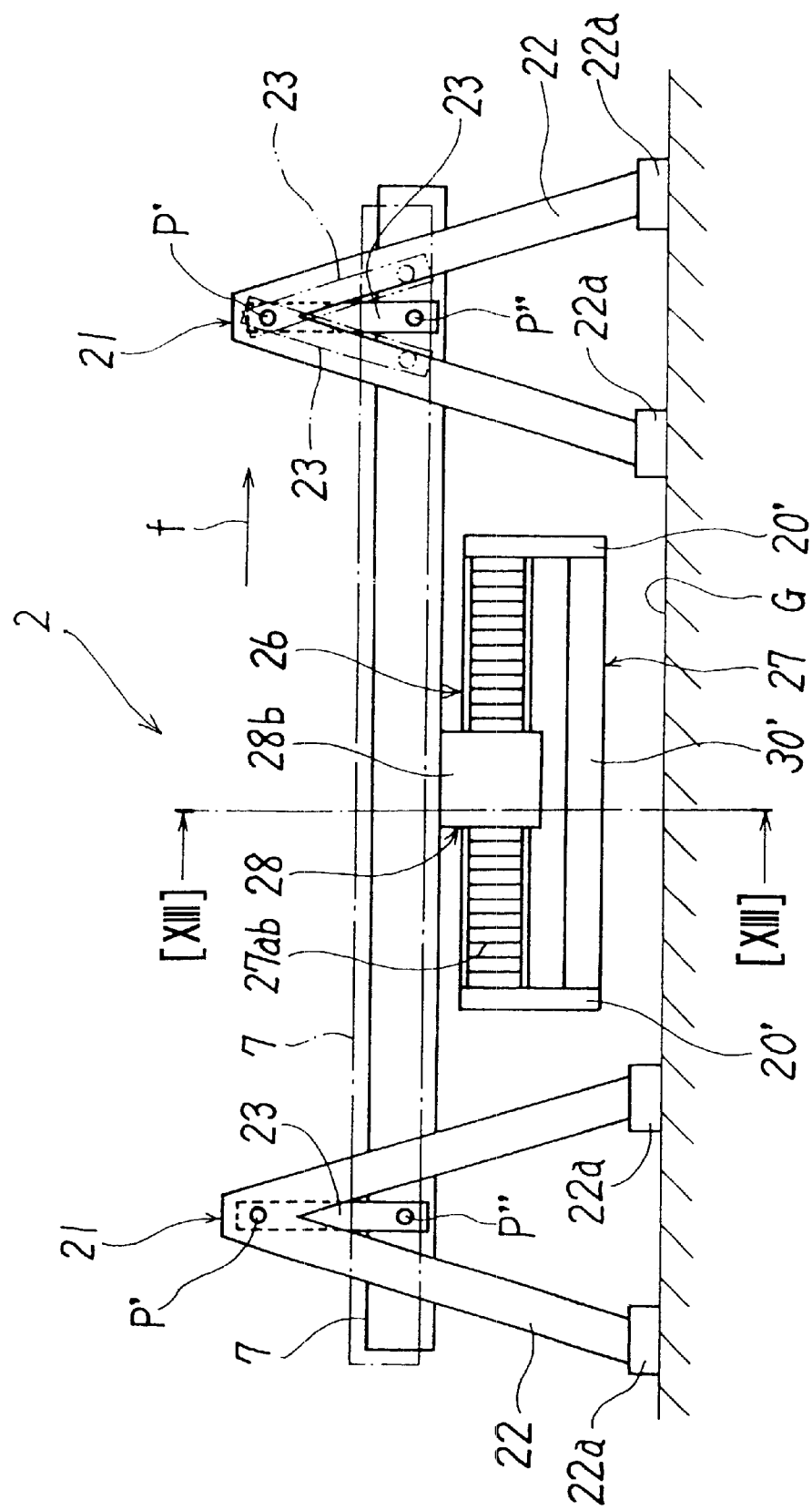
FIG. 11 is a side view of the conveyor according to the second embodiment.

Next, the second embodiment will be described. Those which correspond to the parts in the first embodiment, are denoted by the same reference numerals. Detailed description will be omitted. A vibratory conveyor 2 of the second embodiment is shown perspectively, in FIG. 10. The front view is shown in FIG. 11. Plural supporters 21 are used instead of the support mechanism 11. A linear motor 26 is used instead of the linear motor 16 of the first embodiment. The trough 7 is shown by the dot-dash lines in order to clearly show the supporters 21 and linear motor 26.

Figure 12:
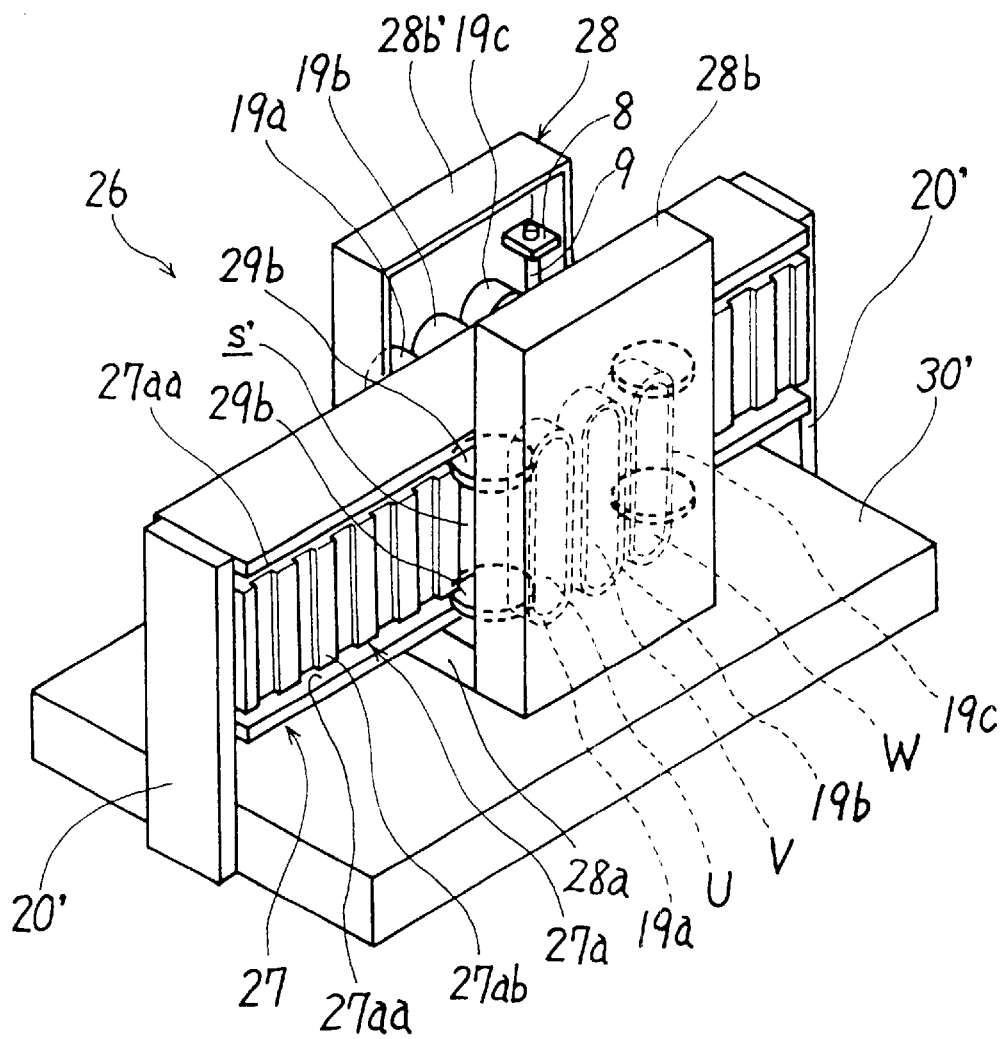
FIG. 12 is a perspective view of a linear motor used in the second embodiment.
Figure 13:
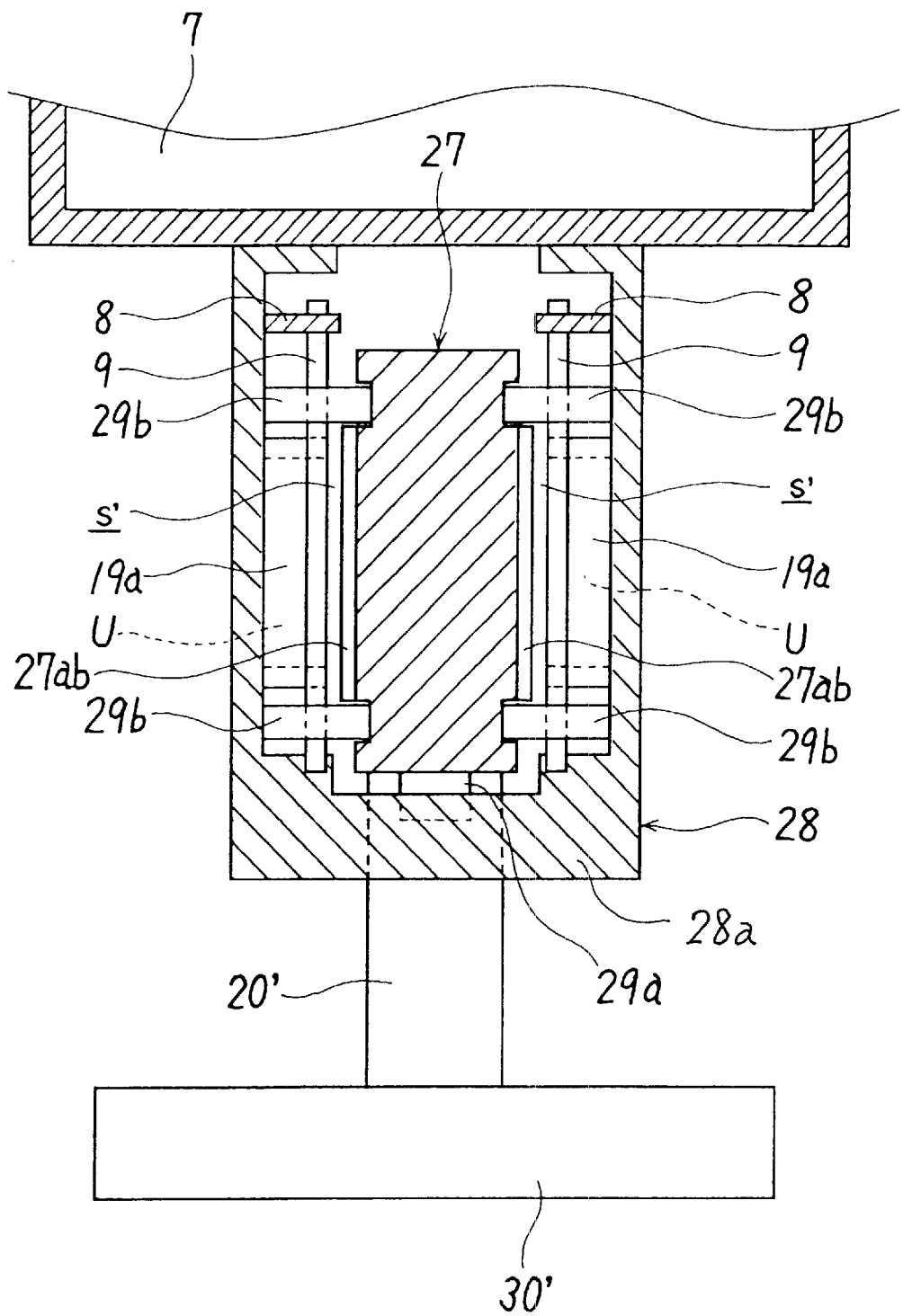
FIG. 13 is a cross-sectional view taken along the line [XIII]—[XIII] in FIG. 11.

Supporters 21 includes a pendulum mechanism. It consists of the inverted-V shaped support member 22 and swing levers 23 suspended from the top of the support member 22 at pin p'. As shown in FIG. 11, the linear motor 26 consists of a primary member 28 fixed on the bottom of the trough 7 and the secondary member 27 inserting through the primary member 28. FIG. 12 shows an enlarged view of the linear motor 26. FIG. 13 is a cross-section view take along the line [XIII]—[XIII] in FIG. 11. A primary member 28 consists of horizontal portion 28a and support members 28b, 28b' supporting the horizontal portion 28a. It is U-shaped.

The upper surface of support members 28b, 28b' are fixed on the trough 7. The coils 19a, 19b and 19c and not-shown laminar permanent magnets (three) are arranged in the support members 28b, 28b'. Rollers 29a of non-magnet material (FIG. 13) are arranged in a horizontal portion 28a of the primary member 28, and the upper portions are projected from the horizontal portion 28a and supports slidably the secondary member 27. The secondary members 27 is parallel-piped, extending in the transporting direction of the trough 7. Grooves 27aa are formed in the upper and lower portions of the side walls 27a. The wheels 29b are supported by shafts 9 held by the mounting members 8. Plural magnet teeth 27ab are so formed in the central so as to face the magnet poles U, V, W. Air gap s' is formed by fitting the wheels 29b to grooves 27aa between magnet teeth 27ab and magnet poles U, V, W. Further, the mounting member 20' is arranged in the secondary members 27. An additional mass 30' of metal in the form of block is fixed to the mounting members 20'. In this embodiment, the secondary members 27 are suspended from the primary member 28 in the air. It is spaced from the mounting ground G.

The construction of the vibratory conveyor 2 of the second embodiment has been described. Next, operation will be described. Operation principle of the linear motor 26 is equal to the linear motor 16 of the first embodiment. Accordingly, the detailed description will be omitted.

Alternating currents are flowed through the coils 19a, 19b and 19c of the linear motor 26, shifted from other in phase by 120 degrees. As described in the first embodiment, magnet attractive force is generated between the magnet-teeth 27ab and the poles U,V,W. Thus, the primary member 28 is moved rightwards. In this embodiment, the trough 7 is fixed to the primary member 28.

The secondary member 27 is engaged with the primary member 28 through the rollers 29a and the wheels 29b.

Accordingly, it receive the opposite force to the driving force of the primary member 28. Thus, it is moved leftwards. The current is so controlled that the trough 7 is moved slowly with the object to be transported. The supporters 21 are swingable in the manner as shown by the two-dot-dash lines and dot-dash line in FIG. 11.

The current is flowed through the coils 19a, 19b, 19c wound on the poles U,V,W. The trough 7 fixed to primary member 28 is moved leftwards and the secondary member 27 is moved rightwards. The current is so adjusted that the primary member 28 can be moved rapidly. The supporters 21 supporting the trough 7 swing in the manner shown by dot-dash lines and two-dot-dashlines in FIG. 11.

The trough 7 is moved slowly in the transporting direction of the object and moved rapidly in opposite direction to the transporting direction. The object is transported rightwards in the trough 7.

In the vibratory conveyor 2 of this embodiment, the linear motor 26 is used as exciting source for driving the trough horizontally. It can generate a driving force of an arbitrary form. The object can be transported efficiently in the trough 7. The change of the transporting direction and the transporting speed can be adjusted easily without the complicating construction. Further, no gear is used. Accordingly, little noise is made. Also in the vibratory conveyor 2 of this embodiment, the reaction of the primary member 28 of the linear motor 26 is not transmitted to the mounting surface, since the secondary member 27 can be free moved in the air.

Next, a vibratory conveyor 3 according to a third embodiment of this invention will be described with reference to FIG. 14 to 16. The parts which correspond to the parts in above embodiments, are denoted by the same reference numerals and the detailed description of which will be omitted.

Figure 14:
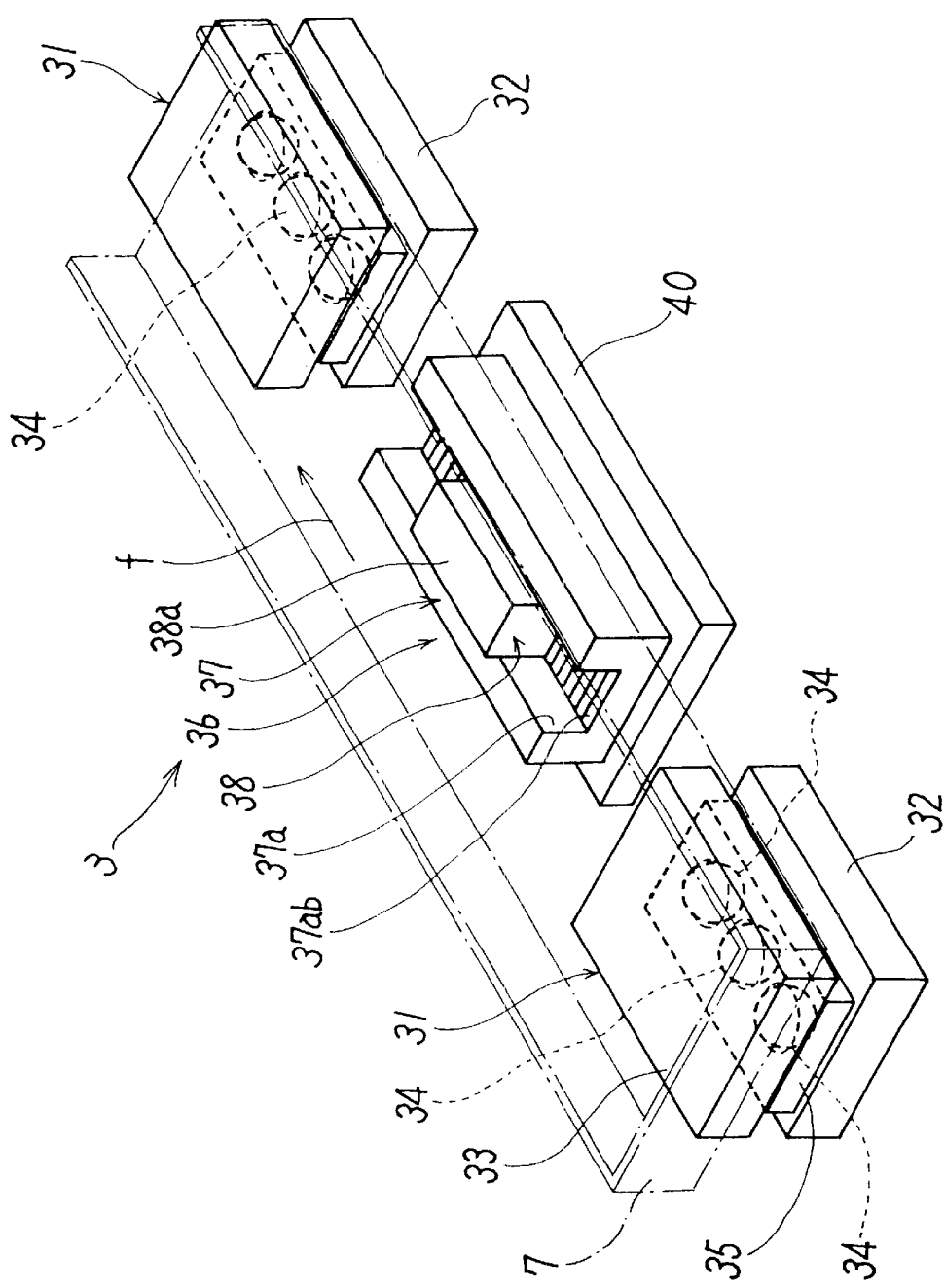
FIG. 14 is a perspective view of a vibratory conveyor according to a third embodiment of this invention.
Figure 15:
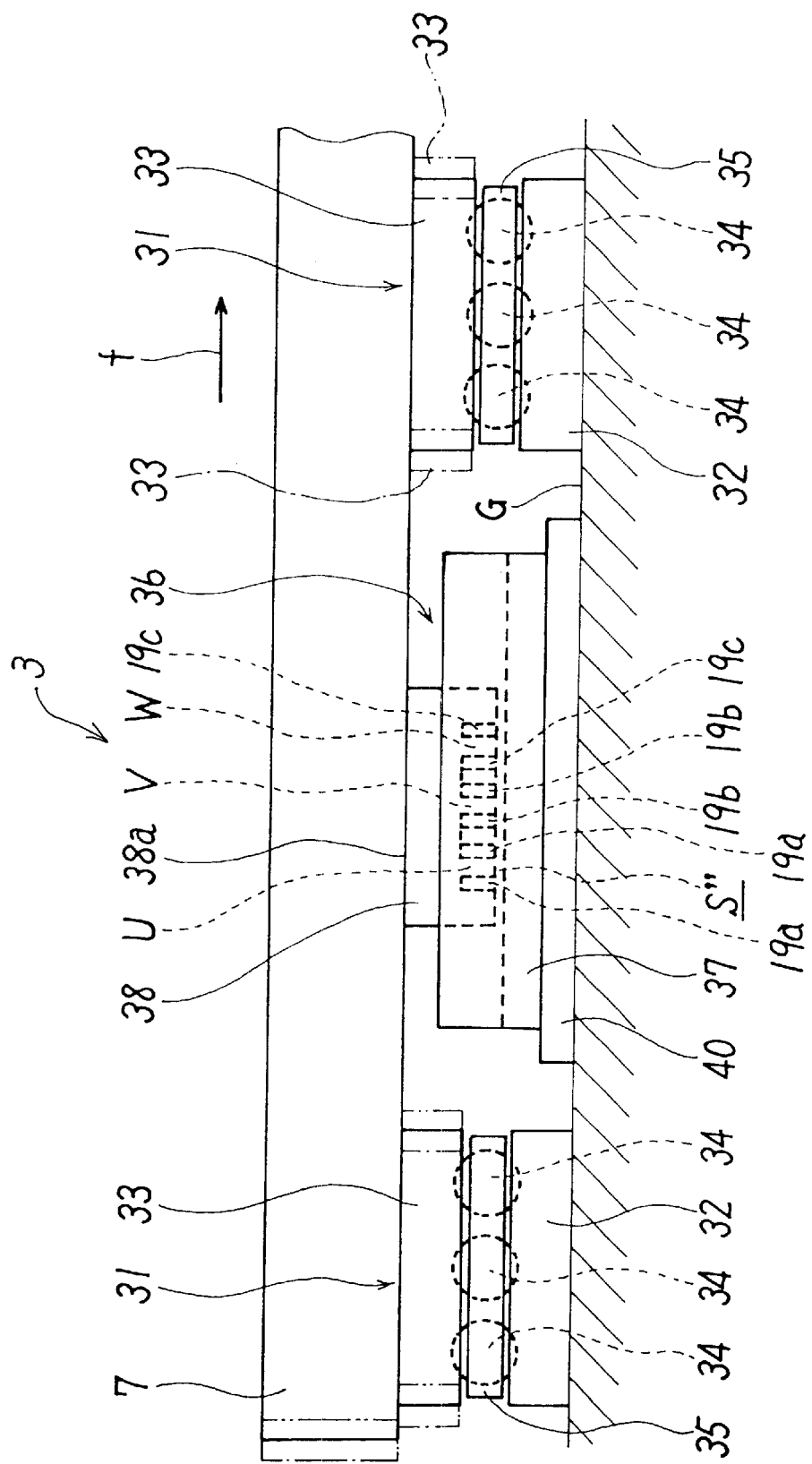
FIG. 15 is a side view of the vibratory conveyor according to the third embodiment.

FIG. 14 and FIG. 15 show perspective and front views, respectively. Plural support mechanism 31 as shown in FIG. 14 and 15 are used insteads of the supporters 21 in the above embodiment. A linear motor 36 is used insteads of the linear motors 16 and 26. Also in FIG. 14, the trough 7 is shown by the dot-dash lines to clearly show support mechanism 31 and linear motor 36.

The support mechanism 31 of this embodiment, function as a linear guide. It consists of a fixing part 32, balls 34 rotatably held by a holding case 35 and a movable part 33 arranged slidably through not-shown linear mechanism. U-shaped linear recesses are formed in the bottom of the movable part 33. The balls 34 can be rotated in the recess. Grease may be supplied to the recess so as to easily rotate balls 34.

Figure 16:
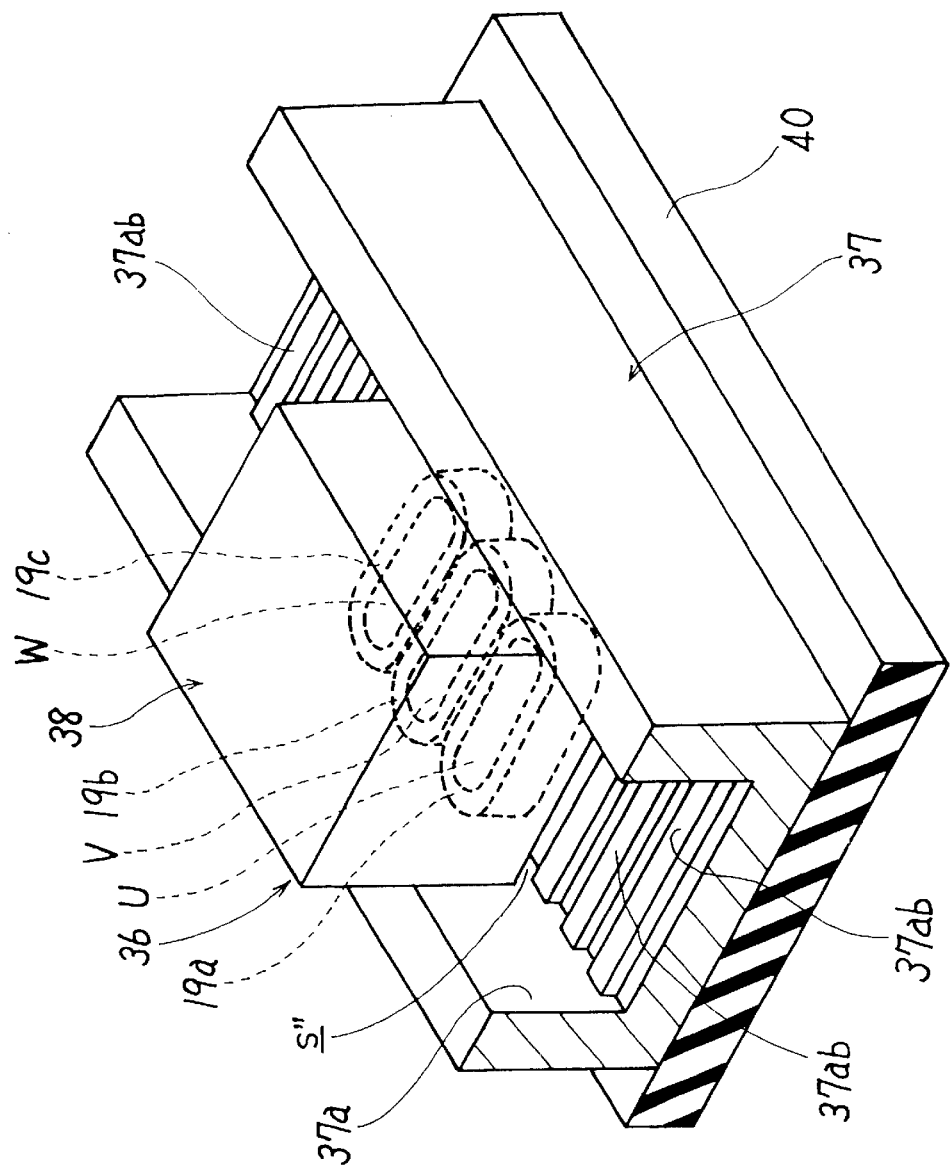
FIG. 16 is a perspective view of a linear motor used in the third embodiment.
Figure 17:
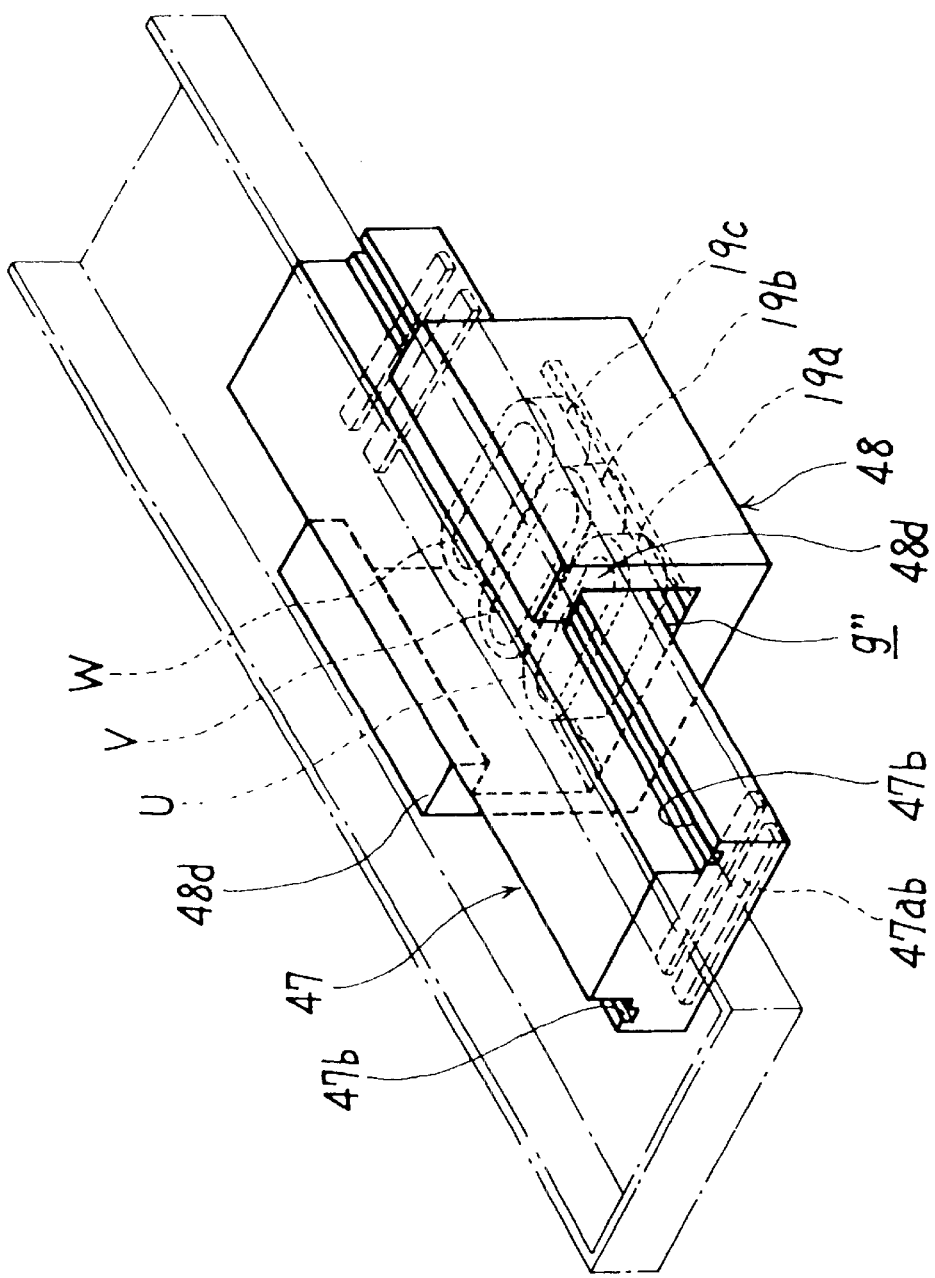
FIG. 17 is a perspective view of a vibratory conveyor according to a fourth embodiment of this invention.

The linear motor 36 in this embodiment as shown enlargedly in FIG. 16, consist of a primary member 38 fixed to the trough 7, and a secondary member 37 supported through a plate-like vibration-absorbing material 40 on the ground (not shown). The primary member 38 is almost parallel-piped and the trough 7 is fixed on the upper surface 38a. The coils 19a, 19b, 19c are wound on the poles U, V, W having permanent magnets. The coils 19a, 19b, 19c are arranged in the lower potion of the primary member 38. A groove 37a is formed in the secondary member 37. The primary member 38 can be slided in the groove 37a. The cross section of the secondary member is U-shaped. The plural teeth 37ab are formed between the groove 37a, and arranged vertically to the transporting direction. An air gap s" is formed by not-shown wheel or linear guide between the teeth 37ab and the primary member 38.

Constructions of the vibratory conveyor 3 have been described. Next, operations will be described.

Similarly to the above embodiment, alternating currents shifted in phase from each other by 120 degrees are flowed through the coils 19a, 19b ,19c of the linear motor 36. The magnetic attractive force is generated between the magnetic poles U, V, W and the magnet teeth 37ab. Thus, the primary member 38 is moved rightwards. The trough 7 fixed on the primary member 38 is also moved rightwards. The secondary member 37 receive the reactive force in opposite direction to the exciting force generated from the first primary member 38 through the not-shown wheel of non-magnetic material. The secondary member 37 is arranged through the vibration-absorbing rubber 40 on the mounting surface. Accordingly, the reactive force or reaction force received by the secondary member 37 is absorbed by the vibration absorbing rubber 40. The current is so controlled that the trough 7 is moved slowly forwards and the object and the trough 7 are moved together. The moved part 33 of the support mechanism 31 supporting the trough 7 is reciprocating as shown by the dot-dash lines in FIG. 15.

The reverse currents are supplied to the coils 19a, 19b, 19c wound on the magnet poles U, V, W. The trough 7 is moved leftwards. The secondary member 37 receives a reaction force. It is absorbed by the vibration-absorbing rubber 40. In this time, the exciting force overcomes a stationary frictional force between the object and the trough 7. The primary member 38 is moved backwards rapidly. The current is so controlled as to obtain the rapid movement. The moving part 33 of the support mechanism 31 supporting the trough 7 is reciprocated as shown by the dot-dash lines and two-dot-dash lines. In the above operation, the object is transported rightwards in the trough 7.

Also in the vibratory conveyor 3 of this embodiment, the linear motor 36 is used as an exciting source for vibrating the trough horizontally. Accordingly, an exciting force of an arbitrary form can be obtained, and so the objects can be transported efficiently in the trough 7. The change-over of the transporting direction and the transporting speed can be easily adjusted without complicated construction. No gear is used and so little noise is made from the vibratory conveyor 3. The secondary member 37 of the linear motor 36 for driving the vibratory conveyor 3 is arranged through the vibration-absorbing rubber 40 on the mounting surface. When the trough 7 is vibrated by the linear motor 36, the reaction force of the secondary member 37 is not transmitted to the mounting surface, since it is absorbed by the vibration-absorbing rubber 40.

Figure 21:
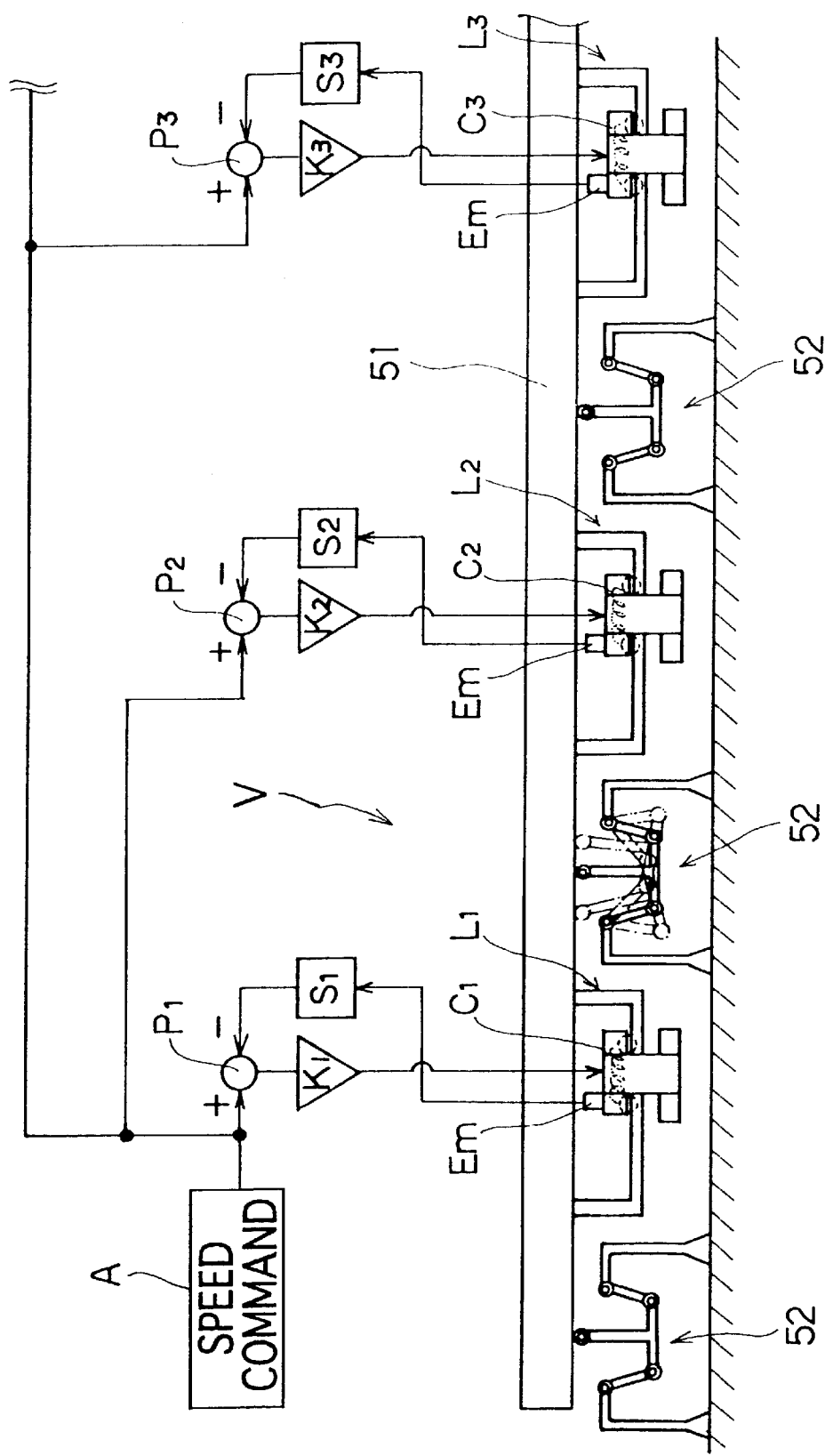
FIG. 21 is a side view of a vibratory conveyor according to a sixth embodiment of this invention.

FIG. 21 shows a vibratory conveyor according to a sixth embodiment of this invention.

A vibratory conveyor of this embodiment is generally represented by a reference mark V.

A trough 51 is longer than the trough 7 of the above embodiments, and supported through plural support mechanism 52 at regular intervals on the ground, which are similar to those 11 of the first embodiment.

The linear motor means consists of plural linear motors $L_1$, $L_2$, $L_3$, ... which are equivalent to the linear motors of the first embodiment. Drive command is supplied to coils $C_1$, $C_2$, $C_3$ ... of primary members in the following manner. Speed command (saw-tooth shapedly change) as the drive command is supplied to a comparator P1 from a speed command source A. A signal representing relative position of the primary member to the secondary member from an encoder Em attached to the primary member is supplied to a differentiater $S_1$ and then a speed signal there from is supplied to another input terminal of the comparator P1. The speed command from the speed command source A and actual speed are compared with the comparator P1. and the difference is amplified by an amplifier $K_1$ having gain K1 and the output is supplied to the coils $C_1$ of the primary member. Thus, the relative speed of the primary member to the secondary member is so controlled as to be equal to the command.

The same speed command from the speed command source A is supplied to a second comparator P2. A signal representing a relative position of a primary member to a secondary member from the encoder Em attached to the primary member of a second linear motor L2 is supplied to a second differenciator S2. Thus, the speed signal is supplied to another input terminal of the second comparator P2. The difference is supplied to a second amplifier K2 having gain K2. The amplified output is supplied to the coils C2 of the primary member of the linear motor $L_2$. Thus,the speed command is supplied to the first coil C1 of the first linear motor L1 and the second coil C2 of the primary member of the second liner motor L2 in synchronization with each other. In the above descrived manner,the speed command is supplied to the first, second, third . . . liner motors $L_1$, $L_2$, $L_3$ . . . . Although the trough 51 is longer, it can be smoothly vibrated without distortion,. by the synchronized speed command, and the objects can be smoothly transported rightwards in the trough 51.

Figure 22:
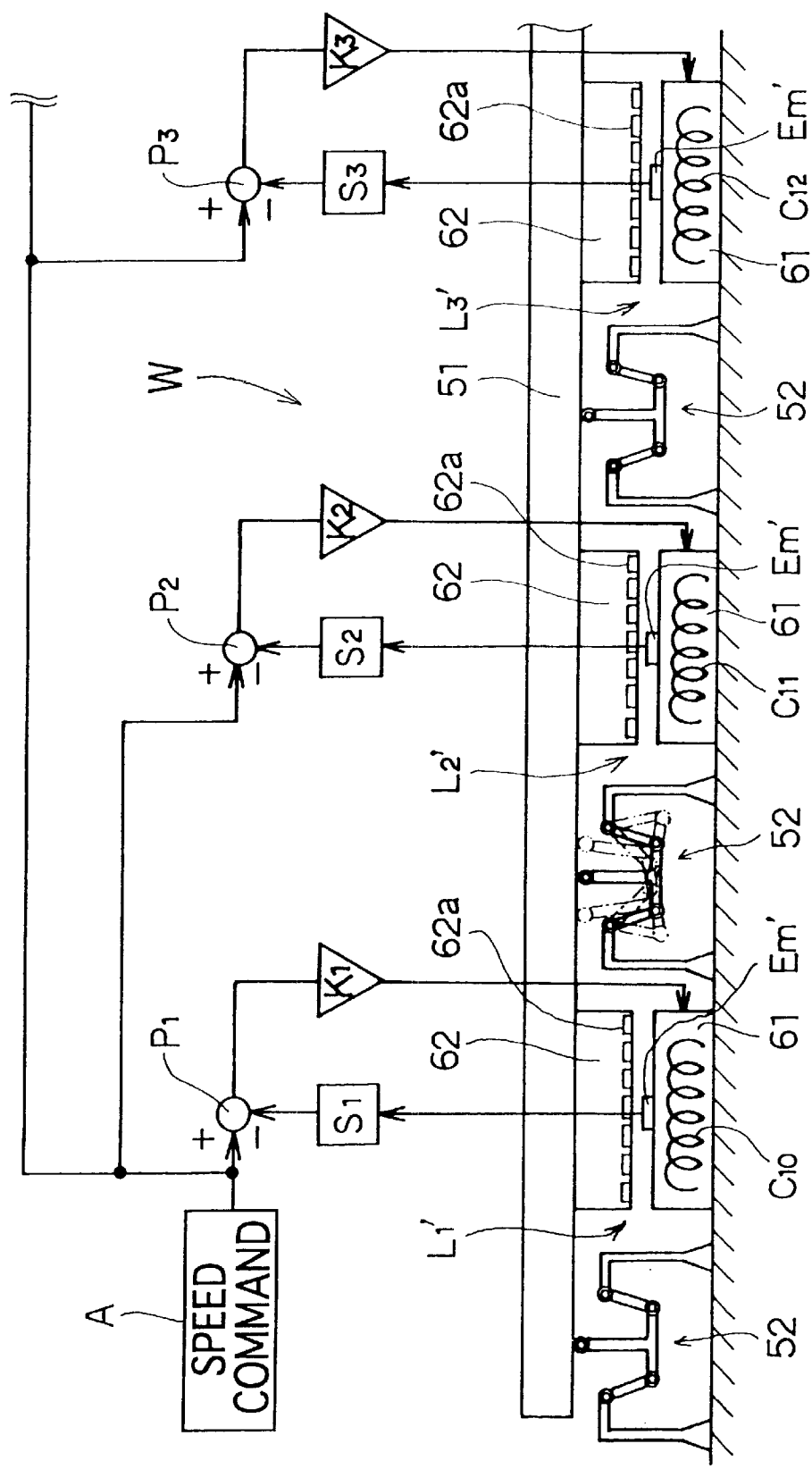
FIG. 22 is a side view of a vibratory conveyor according to a senventh embodiment of this invention.

FIG. 22 shows a vibratory conveyor according to a seventh embodiment of this invention. Those which correspond to the parts of the above described embodiment, are represented by the same reference numerals and the detailed description of which will be omitted.

A vibratory conveyor of this embodiment is generally represented by a reference mark W.

Also in this embodiment, the predetermined speed command is supplied to the first comparator $P_1$. Output of the encoder Em' attached to the primary member is supplied to the first differenciator $S_1$. The differenciated output is supplied to another input terminal of the first comparator $P_1$. According to this embodiment, a primary member including coils C10 is fixed to the ground. Magnetic teeth 62a of a secondary member 62 are facing to the primary member 61 with a small air gap, which is exaggeratedly shown in FIG. 22. The encoder EM' detects a relative position of the secondary member 62 to the first primary member 61. The same speed command is supplied to the comparators $P_2$, $P_3$, . . . of the linear motors $L_1$, $L_2$, $L_3$, $L_4$ . . . .

The signal representing the relative position of the secondary member 62 of the primary member 61 is generated from the encoder EM'. It is differentiated by the differentiator $S_1$, and t differentiated output is supplied to the first comparator $P_1$. The difference between the speed command and the actual speed is amplified by the amplifier $K_1$ and the output is supplied to the coils C10 of the primary member 61 fixed on the ground. Thus, the driving force corresponding to the speed command is applied to the trough 51 and the trough is vibrated at the predetermined speed (in saw tooth form). The speed command is supplied also to a second comparator $P_2$ from the speed comparator source A. The signal representing the relative position of the secondary member 62 to the primary member 61 is supplied to a differentiater $S_2$. It is differentiated thereby. The difference between the speed command and the actual speed is amplified by the amplifier $K_2$ having gain $K_2$. And it is supplied to the coils $C_{11}$ of the primary member 61. In the similar manner, the same speed command is supplied to the linear motors L1', L2', L3' . . . . Although the trough 51 is long, it can be smoothly vibrated, and the object can be smoothly conveyed in the trough 51. Although not shown, the primary members 61 are supported through vibration-absorbing materials on the ground. The long trough 51 can vibrate without distortion, and so the object can be smoothly transported.

Figure 23:
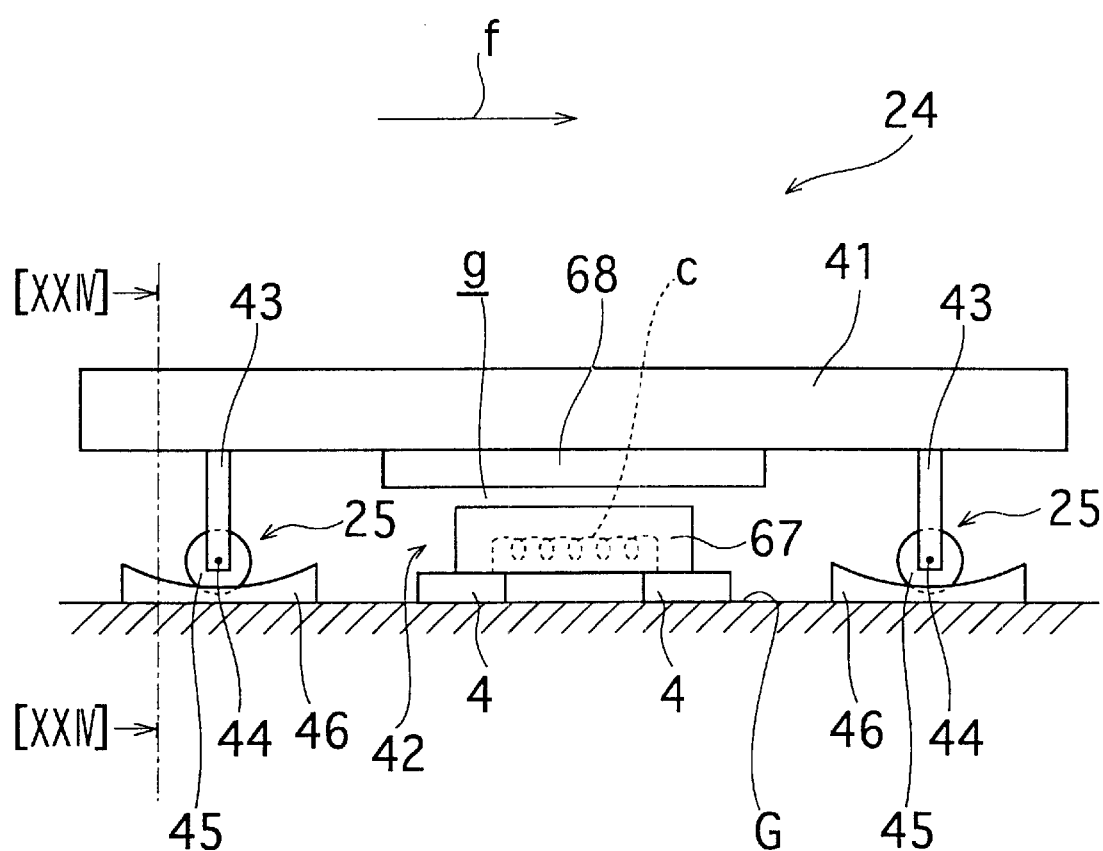
FIG. 23 is a side view of a vibratory conveyor according to an eighth embodiment of this invention.
Figure 24:
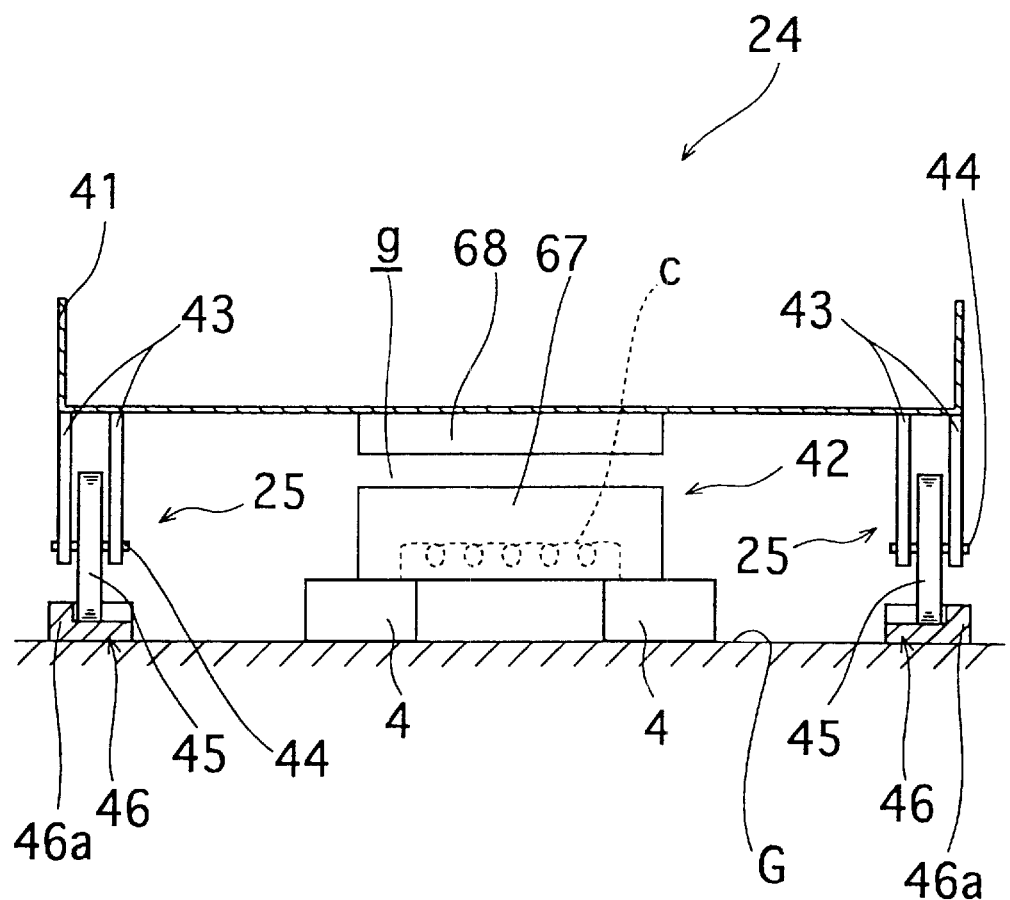
FIG. 24 is a cross-sectional view taken along the line [XXIV]—[XXIV] in FIG. 23.

FIG. 23 shows a vibratory conveyor 24 according to an eighth embodiment of this invention. FIG. 24 is a cross-sectional view taken along the line [XXIV]—[XXIV] in FIG. 23. A trough 41 is supported by plural supporters 25 paired at both sides of the trough 41. The trough 41 is excited by a linear motor 42. The supporters 25 are used instead of the support mechanism 11 of the first embodiment. Vertical plates 43 are fixed to the bottom of the trough 41. Rollers 45 are supported by shafts 44 attached to the vertical plates 43. The rollers or wheels 45 are guided by arcuate guide rails 46 fixed on the ground. The guide surfaces for the wheels 45 are arcuate. L-shaped portions 46a are formed for regulating the movement of the wheels 45, integrally with the guide rail 46. Thus, the trough 41 is prevented from shifting laterelally.

The construction of the vibratory conveyor 24 operation is described.

With the energization of the linear motor 42, the trough 41 is horizontally vibrated, while the wheels 45 are rolling along the guide rails 46. The rolling surfaces of the guide rails 46 are arcuate, and so the centering action is supplied to the wheels 45, so that the trough 41 is urged to move back to the balancing position or the neutral position. The secondary member 68 is prevented from being shifted from the primary member 67 fixed on the ground G through the rubbers 4, so that the desired thrust can be surely obtained. Further, the supporters 25 can be arranged in compact under the trough 41.

Figure 25:
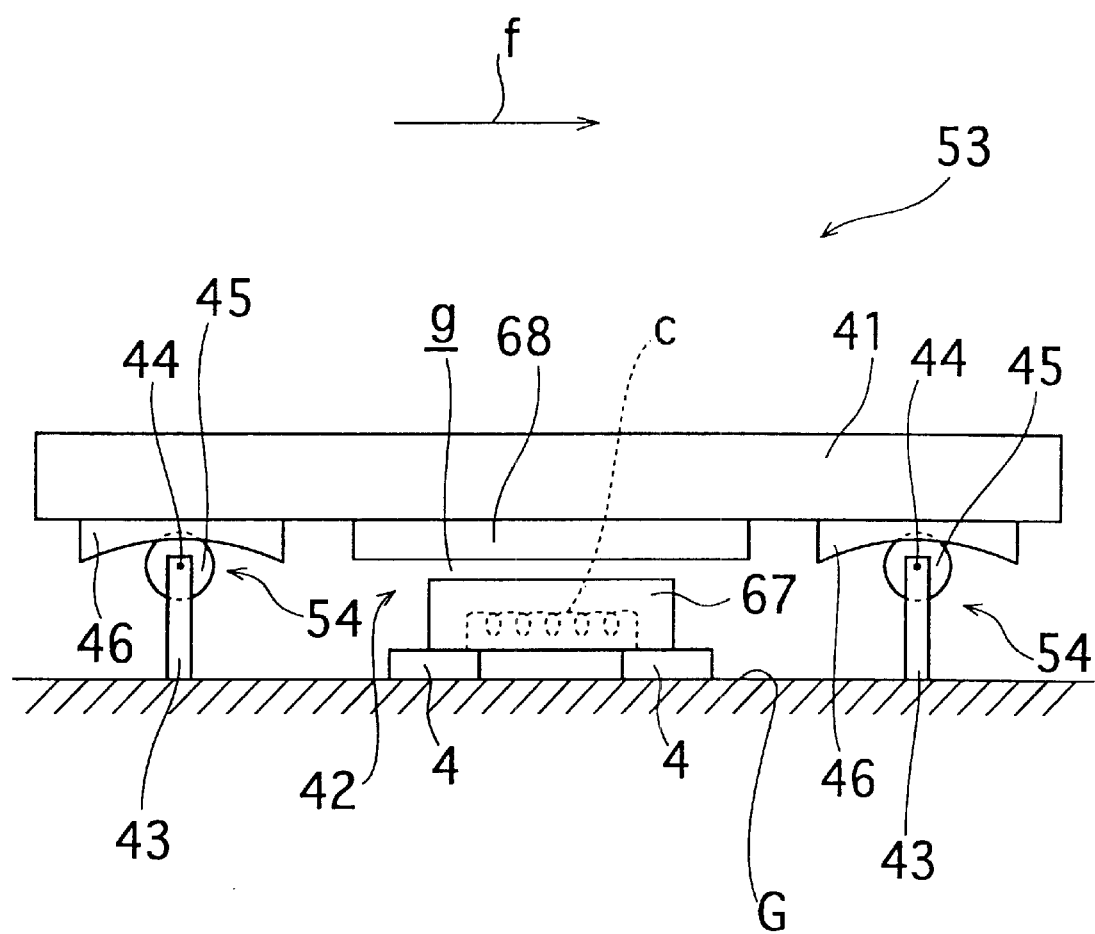
FIG. 25 is a side view of a vibratory conveyor according to a ninth embodiment of this invention.

Next, a vibratory conveyor 53 according a ninth embodiment of this invention will be described with reference to FIG. 25. Those which correspond to the parts in the above embodiment, are denoted by the same reference numerals and the detailed description of which will be omitted.

In the vibratory conveyor 53, the trough 41 is supported by supporters 54 at both sides of trough 41. The linear motor 42 excites the trough 41 in the horizontal direction. The arrangement relationship between the wheels 45 and the guide rails 46 are inverted in this embodiment. The guide rails 46 are fixed on the bottom of the trough 41. The wheels 45 are rotatably supported by vertical arms 43 on the ground G. The wheels 45 are guided by the arcuate guides 46. Thus, similarly to the above embodiment, the restoring or centering force is applied to the trough 41 and the mounting space can be small for the supporters 32.

While the preferred embodiments have been described, variations thereto will occur to those skilled in the art within the scope of the present inventive concepts which are delineated by the following claims.

Figure 18:
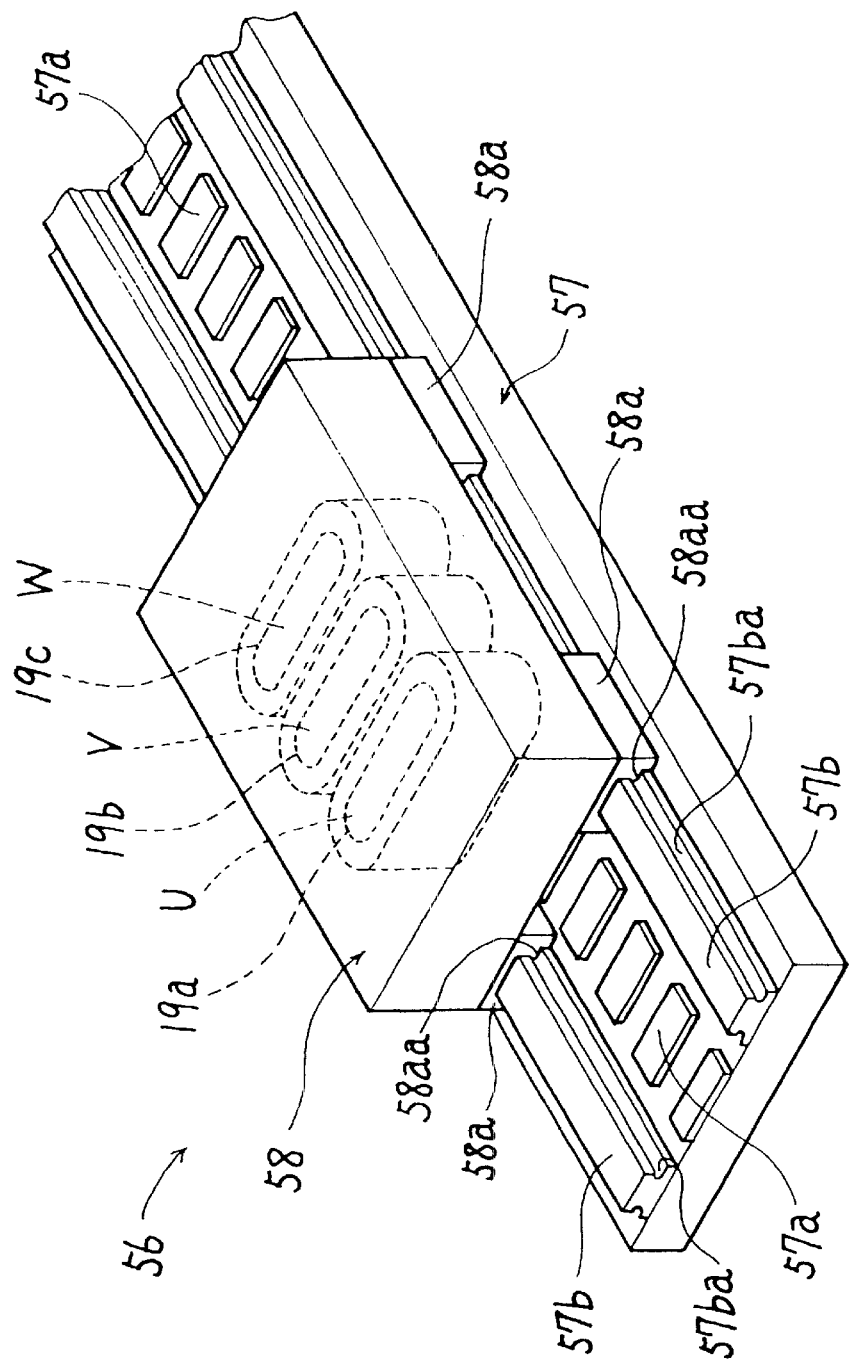
FIG. 18 is a perspective view of a vibratory conveyor according to a fifth embodiment of this invention.

For example, in the embodiment of FIG. 18, the secondary member 57 may be supported through elastic material or vibration-absorbing material on the ground, while the trough is fixed on the upper surface of the primary member 58.

Further, in the linear motors 16 or 26, the additional masses 30 or 30' is fixed through the fixing member 20 or 20' to the primary member 18 or secondary member 27, so that the acceleration of the primary member 18 or secondary member 27 is reduced (the second law of motion), and the displacement of the primary member 18 or secondary member 27 is reduced relative to the displacement of the secondary member 17 or primary member 28. However, when the mass of primary member 18 or of the secondary member 27 is sufficiently large, the fixing members 20, 20' and the additional mass 30, 30' can be omitted.

In the third embodiment, the member 37 of the linear motor 36 is supported though the plate-like rubber 40 as the elastic material on the ground G. Sponge may be used instead of the rubber 40. Or the member 37 may be arranged on a plate supported by plural coil springs which are mounted on the ground G.

Further in the above embodiments, the high-density type in which the permanent magnets are used, is employed as the linear motors 16, 26 and 36. Of course, a linear motor of the other type, for example, the well-known linear induction motor or linear pulse motor which is disclosed for example, in the Japanese patent No. 1495069, may be used.

Further, in the above embodiments, the supporter 11 of the first embodiment includes the link mechanism, the supporter 3' of the second embodiment includes the pendulum mechanism and the supporter 31 of the third embodiment includes the linear guide. Of course a supporter of the other type may be used. For example, the supporter which is disclosed in the Japanese Patent Opening Gazzette No. 315546/1997, may be used.

Further, in the sixth and seventh embodiments, the relative position of the primary or secondary member to the secondary or primary member is detected by the encoder EM'. The detector is not limited to the encoder. For example, optical means or magnetic means may be used instead of the encoder.

Further, in the sixth and seventh embodiments, the predetermined speed command is supplied to the linear motor $L_1, L_2, L_3 \ldots$ from the speed command supply source A. A position command or acceleration command may be used as a drive command.

Further, in the embodiments of FIG. 6 to FIG. 18, a drive command may be applied to the linear motor, while it has not been described.

Further in the eighth and ninth embodiments, the guiding surface of the guide block 46 is in the form of a part of circle. However, it may be in the form of a part of ellipsoid.

What is claimed is:

1. In a vibratory conveyor which includes a trough for transporting objects therealong in a longitudinal direction, exciting means for vibrating said trough in a direction horizontal to said longitudinal direction and supporting means for supporting said trough so as to be vibratile in said horizontal direction, the improvements comprising said exciting means including linear motor means having primary and secondary sides with one of said sides being fixed to said trough and the other of said sides facing to said one side with a predetermined gap and so arranged as to be vibratile relative to said one side, said trough being elongated, said linear motor means consisting of plural linear motors, and means for supplying a drive command to said linear motors for driving them in synchronization with each other.

2. A vibratory conveyor according to claim 1 in which said drive command is a command selected from the group consisting of a position command, a speed command, a force command and an acceleration command.

3. A vibratory conveyor according to claim 1 in which said supporting means is comprised of wheel means rotatably supported by said trough or ground, and guide rail means having an arcuate surface for guiding said wheel means.

* * * * *